US008978807B2

(12) United States Patent
Parness et al.

(10) Patent No.: US 8,978,807 B2
(45) Date of Patent: Mar. 17, 2015

(54) TERRAIN TRAVERSING DEVICE HAVING A WHEEL WITH MICROHOOKS

(71) Applicant: California Institute of Technology, Pasadena, CA (US)

(72) Inventors: Aaron Parness, Los Angeles, CA (US); Kalind C. Carpenter, Pasadena, CA (US); Nicholas Wiltsie, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 14/207,337

(22) Filed: Mar. 12, 2014

(65) Prior Publication Data

US 2014/0203623 A1 Jul. 24, 2014

Related U.S. Application Data

(63) Continuation-in-part of application No. 13/606,885, filed on Sep. 7, 2012, now Pat. No. 8,789,629.

(60) Provisional application No. 61/778,004, filed on Mar. 12, 2013, provisional application No. 61/533,042, filed on Sep. 9, 2011.

(51) Int. Cl.
*B60B 15/00* (2006.01)
*B62D 57/024* (2006.01)
*B60B 15/02* (2006.01)
*B60B 9/12* (2006.01)

(52) U.S. Cl.
CPC ............. *B62D 57/024* (2013.01); *B60B 9/12* (2013.01); *B60B 15/025* (2013.01); *B60B 2900/721* (2013.01); *B60Y 2200/46* (2013.01); *B60Y 2200/47* (2013.01); *B60Y 2200/48* (2013.01)
USPC ........................................... 180/218

(58) Field of Classification Search
USPC .................................................. 180/7.1, 218
See application file for complete search history.

(56) References Cited

U.S. PATENT DOCUMENTS

| 6,006,607 | A * | 12/1999 | Bryzek et al. ............ 73/727 |
| 6,502,657 | B2 * | 1/2003 | Kerrebrock et al. ......... 180/218 |
| 6,548,982 | B1 * | 4/2003 | Papanikolopoulos et al. ........... 318/568.11 |
| 7,559,385 | B1 * | 7/2009 | Burt et al. ............ 180/65.1 |
| 8,186,469 | B2 * | 5/2012 | Yim et al. ............ 180/218 |
| 8,496,077 | B2 * | 7/2013 | Nesnas et al. ........... 180/7.5 |

(Continued)

OTHER PUBLICATIONS

1-Asbeck, A., et al., "Climbing walls with microspines." Proceedings of the 2006 IEEE Int'l. Conf. on Robotics & Automation, Orlando, FL, May 2006, pp. 4315-4317.

(Continued)

*Primary Examiner* — Kevin Hurley
(74) *Attorney, Agent, or Firm* — Steinfl & Bruno, LLP

(57) ABSTRACT

A terrain traversing device is described. The device includes an annular rotor element with a plurality of co-planar microspine hooks arranged on the periphery of the annular rotor element. Each microspine hook has an independently flexible suspension configuration that permits the microspine hook to initially engage an irregularity in a terrain surface at a preset initial engagement angle and subsequently engage the irregularity with a continuously varying engagement angle when the annular rotor element is rotated for urging the terrain traversing device to traverse a terrain surface. Improvements related to the design, fabrication and use of the microspine hooks in the device are also described.

11 Claims, 23 Drawing Sheets

(56) References Cited

U.S. PATENT DOCUMENTS

| | | | |
|---|---|---|---|
| 8,505,667 B2* | 8/2013 | Kim et al. | 180/218 |
| 2002/0036104 A1* | 3/2002 | Kerrebrock et al. | 180/6.2 |
| 2003/0137268 A1* | 7/2003 | Papanikolopoulos et al. | 318/568.11 |
| 2004/0000439 A1* | 1/2004 | Burt et al. | 180/7.1 |
| 2010/0152922 A1* | 6/2010 | Carlson et al. | 701/2 |
| 2011/0073386 A1* | 3/2011 | Provancher | 180/7.1 |
| 2013/0068527 A1* | 3/2013 | Parness et al. | 175/57 |

OTHER PUBLICATIONS

2-Barnes, M., et al., "ThrowBot: Design considerations for a man-portable throwable robot." Proceedings of the SPIE Unmanned Ground Vehicle Tech. VII, Orlando, FL, Mar. 2006, pp. 1-10.

3-Birkmeyer, P., et al. "DASH: A dynamic 16g hexapedal robot." 2009 IEEE/RSJ Int'l. Conf. on Intelligent Robots and Systems, St. Louis, MO, Oct. 11-15, 2009, pp. 2683-2689.

4-iRobot: Robots for Defense and Security retrieved from <http://www.irobot.com/en/us/robots/defense.aspx> on May 7, 2013.

5-Murphy, M., et al."Waalbot: An agile small-scale wall climbing robot utilizing pressure sensitive adhesives." Proceedings of the 2006 IEEE/RSJ Int'l. Conf. on Intelligent Robots and Systems, Being, China, Oct. 9-16, 2006, pp. 3411-3416.

6-Parness, A., et al. "Climbing rough vertical surfaces with hierarchical directional adhesion." 2009 IEEE Int'l. Conf. on Robotics and Automation—Kobe Int'l. Conf. Center, Kobe, Japan, May 12-17, 2009, pp. 2675-2680.

7-Silva, M., et al. "A survey of technologies for climbing robots adhesion to surfaces." IEEE Int'l Conf. on Computational Cybernetics (ICCC), Stara Lesna, Slovakia, Nov. 27-29, 2008, pp. 127-132.

8-Spenko, MJ, et al. "Biologically inspired climbing with a hexapedal robot." Univ. of Pennsylvania Scholarly Commons, Department of Electrical & Systems Engineering, Apr. 1, 2008, pp. 1-31.

9-Xiao, J., et al. "Design of mobile robots with wall climbing capability." Proceedings of the 2005 IEEE/ASME Int'l. Conf. on Advanced Intelligent Mechatronics, Monterey, CA, Jul. 24-28, 2005, pp. 438-443.

10-ReconRobotics—World Leader in Tactical Micro-Robot Systems retrieved from <http://reconrobotics.com/> on Nov. 18, 2014.

11-Asbeck, A. T., et al. "Scaling hard vertical surfaces with compliant microspine arrays." The Int. J. of Robotics Res., vol. 25 (12), pp. 1165-1179. Nov. 2006.

12-Dai, Z., et al. "Roughness-dependent friction force of the tarsal claw system in the beetle *Pachnoda marginata* (coleoptera, scarabaeidae)." J. of Exp. Bio., vol. 205 (16), pp. 2479-2488. May 2002.

13-Parness, A. "Anchoring Foot Mechanisms for Sampling and Mobility in Microgravity." IEEE ICRA, Shanghai, China. 2011.pp. 6596-6599.

14-Asbeck, A. et al. "Designing Compliant Spine Mechanisms for Climbing," ASME Journal of Mechanisms and Robotics, vol. 4. Aug. 2012. pp. 031007-1-8.

15-Kim, S. et al. "Spinybot II: Climbing Hard Walls with Compliant Microspines." IEEE ICAR, Seattle, WA, Jul. 2005. 6 pgs.

16-Autumn K., et al. "Robotics in scansorial environments." Proc. SPIE Int. Soc. Opt. Eng. 5804, pp. 291-302. 2005.

17-Lussier, A., et al. "Scansorial Landing and Perching", IEEE ISRR, Nevada, USA. pp. 1-17. 2009.

18- Lussier, A.L., et al. "Landing, perching and taking off from vertical surfaces." The Int. J. of Robotics Res., vol. 30 (3), p. 355-370. 2011.

19-Fischer, W. et al. "Compact Magnetic Wheeled Robot for Inspecting Complex Shaped Structures in Generator Housings and Similar Environments." Proc. Of IEEE/RSJ International Conference on Intelligent Robots and Systems, St. Louis, USA, pp. 4116-4121. 2009.

20-Provancher, W., et al. "Towards penetration-based clawed climbing," CLAWAR, pp. 961-970. 2004.

21-Nesnas, I.A.D., et al., "Axel and DuAxel rovers for the sustainable exploration of extreme terrains," J. of Field Robotics, vol. 29(4), pp. 663-685. 2012.

22-Parness, A, et al. "Gravity-Independent Mobility and Drilling on Natural Rock Using Microspines." IEEE ICRA, St. Paul, MN, USA. pp. 3437-3442. 2012.

23-Parness, A., et al. "Demonstrations of Gravity-Independent Mobility and Drilling on Natural Rock Using Microspines." IEEE International Conference on Robotics and Automation, pp. 3547-3548. May 14-18, 2012.

24-Kennedy, B., et al., "Lemur IIb: A robotic system for steep terrain access." Industrial Robot: An International Journal, vol. 33, pp. 265-269, 2006.

25-Bretl, T., et al. "Free-climbing with a multi-use robot." Experimental Robotics IX, Springer, pp. 449-458. 2006.

26-Parness, A., et al. "Microgravity Coring: A Self-Contained Anchor and Drill for Consolidated Rock." IEEE Aerospace Conference, Big Sky, MT, USA. 2012. 7 pgs.

* cited by examiner

TERRAIN TRAVERSING DEVICE HAVING A WHEEL WITH MICROHOOKS

CROSS REFERENCE TO RELATED APPLICATIONS

This application is a continuation in part of U.S. application Ser. No. 13/606,885 entitled "Terrain Traversing Device Having a Wheel with Microhooks" filed on Sep. 7, 2012, which claims priority under 35 U.S.C. §119(e) from U.S. Provisional Patent Application No. 61/533,042 entitled "DROP: The Durable Reconnaissance and Observation Platform" filed on Sep. 9, 2011, both which are incorporated herein by reference in their entirety. The present application also claims priority to U.S. Provisional Application Ser. No. 61/778,004 entitled "Curb Mounting, Vertical mobility, and Inverted Mobility on Rough Surfaces Using Microspine-Enabled Robots" filed on Mar. 12, 2013, the disclosure of which is incorporated herein by reference in its entirety.

STATEMENT OF GOVERNMENT GRANT

The invention described herein was made in the performance of work under a NASA contract, and is subject to the provisions of Public Law 96-517 (35 USC 202) in which the Contractor has elected to retain title.

FIELD

The present teachings relate to terrain traversing devices such as robots that may be used for reconnaissance purposes. More specifically, the present disclosure first relates to terrain traversing device having a wheel with microhooks that can travel across a horizontal surface such as a floor of a room and then carry out vertical traversal operations such as climbing up a wall, climbing up the steps of a staircase, or climbing over an obstacle such as a curb. Furthermore, this application also relates to further improvements on the design, construction, and use of the microhooks associated with the terrain traversing device.

BACKGROUND

Unexpected obstacles are often encountered when a remotely operated device is used for traversing a hostile and unfamiliar environment, thereby requiring the remotely operated device to have capabilities and features that address and conquer at least some of these unexpected obstacles.

SUMMARY

According to an aspect of the present disclosure, a terrain traversing device is described. The terrain traversing device comprises: a housing; at least one microspine wheel assembly comprising a circular planar rotor with one or more microspine hooks arranged on a circumferential edge of said circular planar rotor, each microspine hook mounted on a respective independently flexible suspension that accommodates variable engagement angles between said microspine hook and irregularities on a terrain surface as the at least one microspine wheel assembly rotates in one direction to urge the terrain traversing device to traverse the terrain surface; at least one axle, wherein the at least one microspine wheel assembly are each mounted on a respective axle whereby the circular planar rotor of each microspine wheel assembly is rotatable in one direction, with the respective axle, to urge the terrain traversing device to traverse the terrain surface; and at least one motor housed in the housing and coupled to the at least one axle, the at least one motor configured to rotate the at least one microspine wheel assembly in one direction to urge the terrain traversing device to traverse the terrain surface.

Further aspects of the disclosure are shown in the specification, drawings, and claims of the present application.

BRIEF DESCRIPTION OF THE DRAWINGS

The accompanying drawings, which are incorporated into and constitute a part of this specification, illustrate one or more embodiments of the present disclosure and, together with the description of a few example embodiments, serve to explain the principles and implementations of the disclosure. The components in the drawings are not necessarily drawn to scale. Instead, emphasis is placed upon clearly illustrating various principles. Moreover, in the drawings, like reference numerals designate corresponding parts throughout the several views.

FIG. 4A shows an example embodiment of a hybrid microspine wheel assembly according to the present disclosure which includes flaps of adhesive material between the microspines for improved climbing performance while

DETAILED DESCRIPTION

Throughout this description, embodiments and variations are described for the purpose of illustrating uses and implementations of the inventive concept. The illustrative description should be understood as presenting examples of the inventive concept, rather than as limiting the scope of the concept as disclosed herein. For example, it will be understood that terminology such as, for example, "microspine wheel assembly," "rotor," "annular," and "irregularity" are used herein as a matter of convenience for description purposes and should not be interpreted literally in a narrowing sense.

For example, the term "rotor" may be broadly understood as representing a circular support element, a circular housing, a cylindrical mount, or an annular element. A person of ordinary skill in the art will understand that these terms may be used interchangeably and as such must be interpreted accordingly. It will be also be understood that the drawings use certain symbols and graphics that must be interpreted broadly as can be normally understood by persons of ordinary skill in the art. As one example, of such interpretation, the microspines are shown in various figures as pointing in a clockwise direction. However, one of ordinary skill in the art will understand that in certain alternative embodiments, microspines may be oriented to point in a counter-clockwise direction. Furthermore, while the description below is generally directed at two-wheeled robots of a relatively small size, various aspects of the invention may be implemented in various other sizes and ways. Further detail is provided for embodiments according to the present disclosure including for example one-wheeled, three-wheeled, or four-wheeled devices, wherein such devices may further include a chassis associated with the wheels and a compartment mounted on the chassis.

General Overview of a Terrain Traversing Device

Figure 1:
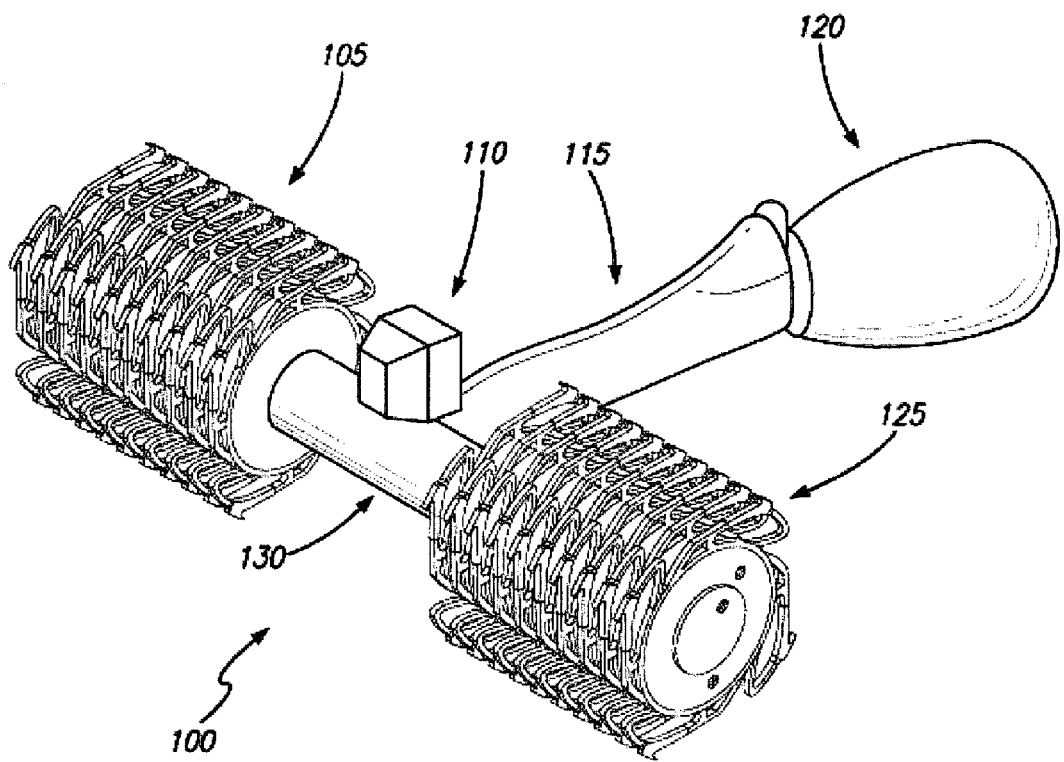
FIG. 1 shows a perspective view of a terrain traversing device according to an example embodiment of the present disclosure.

Attention is now drawn to FIG. 1, which shows a perspective view of an embodiment according to the present disclosure of a terrain traversing device 100 (also referred to, for example, as a rotary microspine climbing robot). The embodiment of the exemplary terrain traversing device 100, shown in FIG. 1, includes a first wheel assembly 105 that is composed of several individual microspine wheel assemblies stacked together in an array arrangement. Further details relating to the microspine wheel assemblies are provided below. The terrain traversing device 100 of FIG. 1 further includes a second wheel assembly 125 that is also formed by assembling several other individual microspine wheel assemblies in a cooperative arrangement so as to permit propulsion of the terrain traversing device 100 as a two-wheeled device over various surfaces.

A tail assembly 115, which includes a bulb 120 at one end, is coupled to a cylindrical housing 130. The tail assembly 115 helps stabilize the terrain traversing device 100 during terrain traversal, especially when the terrain traversing device 100 transitions from a horizontal surface to a vertical surface. The bulb 120 may be designed for various purposes, such as for example, to function as a cushioning element to help protect the terrain traversing device 100 when the terrain traversing device 100 falls to the ground from a high location such as a roof of a building. In alternative embodiments according to the present disclosure, the bulb 120 may be replaced by a pair of tines (not shown), or additional wheel assembly, or other suitable termination, directed at providing stability in various planes, providing maneuverability during travel, or for protecting the terrain traversing device 100 against damage during various types of impacts.

In this example embodiment as seen in FIG. 1, the terrain traversing device 100 has a camera unit 110 mounted on a cylindrical housing 130. In other embodiments, the camera unit 110 may be supplemented or complemented with other sub-assemblies such as a microphone or a detector device. The detector device may be used, for example, to detect chemicals, heat, movement, etc. Furthermore, in this example embodiment as seen in FIG. 1, the cylindrical housing 130 houses internally a pair of motors (not shown) that individually drive each of the first 105 and the second wheel assemblies 125, respectively, via two separate axles (not shown).

As seen in FIG. 1, the terrain traversing device 100 may also include various other elements (not shown) such as a controller unit, communications unit, battery pack, and sensor assemblies for sensing motion-related parameters such as rotations per minute (rpm), torque, slippage, acceleration etc., of the first 105 and the second wheel assemblies 125. These various elements may be suitably housed in one or more of the following: the cylindrical housing 130, the tail assembly 115, and/or the bulb 120. Furthermore, these elements may be used not only to propel the terrain traversing device 100 forward or backwards, but to also provide communication interactions with a remote communications unit (not shown). The remote communications unit (not shown) may be human-operated or may be incorporated into a computer in accordance with various other embodiments according to the present disclosure.

FIG. 1 illustrates only one embodiment of the terrain traversing device 100. Other configurations and variations to such embodiment will be further detailed below.

General Overview of the Microspine

Figure 2:
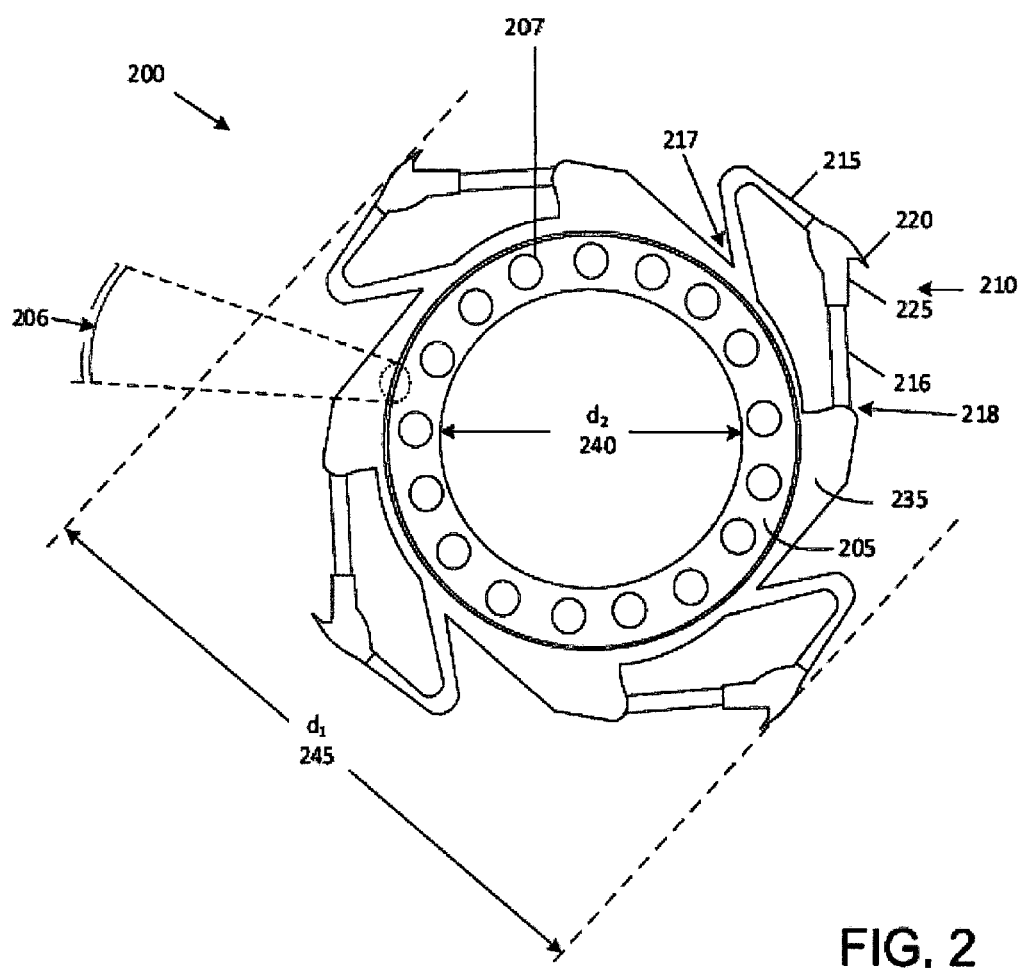
FIG. 2 is a line drawing that shows certain features of a microspine wheel assembly that may be part of the terrain traversing device as shown in FIG. 1.

Attention is now drawn to FIG. 2, which shows an embodiment of a microspine wheel assembly 200 that may be part of terrain traversing devices such as the terrain traversing device 100 illustrated in FIG. 1. Furthermore, this embodiment of the microspine utilizes a back flexure (described in further detail below). As indicated above with FIG. 1, each of the wheel assemblies 105 and 125 of the terrain traversing device 100 are formed by stacking a plurality of microspine wheel assemblies in an array arrangement on an axle. By using a rotary movement to grasp a surface (carried out via the first 105 and second 125 wheel assemblies which each contain one or more microspine wheel assemblies), the microspine wheel assembly provides several advantages over prior art techniques such as those incorporating a linear sliding motion used by robotic legs for obtaining a grip upon a surface. In particular, the linear sliding motion required by robotic legs make them slower and also unsuitable for simple transitions from a horizontal to a vertical surface and is also unsuitable for curb mounting or stair climbing.

As seen in FIG. 2, the embodiment of the microspine wheel assembly 200 may be generally described as a substantially circular planar element with a plurality of microspine hooks (each substantially similar to microspine hook 220) mounted on a peripheral edge 206 of the circular planar element. The peripheral edge 206 may be alternatively referred to herein as a circumferential edge of a rotor 205. The microspine hooks provide a grabbing/grasping action by engaging with irregularities on a traversal surface so as to propel the terrain traversing device over the traversal surface. Though the example embodiment of FIG. 2 shows four microspine hooks, it will be understood that in other embodiments, the number of microspine hooks may range from a single one to quantities other than four. Furthermore, the term "surface", as referred to in this present disclosure, makes reference to substantially horizontal (e.g., ground) and substantially vertical (e.g., walls) surfaces as well as surfaces in between.

Furthermore, it will be understood that the term "irregularities" is used herein to generally indicate any feature of a surface, such as for example, a protrusion or an indentation, that is suitable for one or more microspine hooks to obtain purchase as a part of the grabbing action. Because the microhooks have sharp points, common surfaces have many irregularities as defined here which might otherwise be interpreted by an observer simply as roughness. It will be also understood that the term "engage" is generally used herein in the context of the grabbing action, and one of ordinary skill in the art will recognize that alternative terms such as "purchase," may be used instead without deviating from the spirit of the invention. It will be further understood that the phrase "substantially circular planar element" that is used above may be alternatively referred to herein by various other terms such as for example, "rotor," "circular planar rotor," "circular housing," "cylindrical mount," or an "annular rotor element." However, for convenience of description vis-à-vis identification with reference to FIG. 2, this element will be generally referred to below as "rotor 205."

As seen in FIG. 2, the embodiment of the microspine wheel assembly 200 can be selected to have any suitable thickness based on various factors, such as mechanical strength, rigidity, machinability etc. While there is no particular limitation on the upper end of a thickness range, the lower end of the thickness range may be constrained to thickness corresponding to a cross-sectional dimension (e.g., diameter, width, etc.) of one or more of the microspine hooks 220. The range of thickness permits the microspine wheel assembly 200 of FIG. 2 to be used in a wide variety of applications over a wide variety of surfaces and environments.

With continued reference to FIG. 2, the diameter $d_1$ 245 of the microspine wheel assembly 200 can be selected to have any suitable value based on a few parameters, such as, for example, the weight, height and/or a desired rate of travel of the terrain traversing device 200. However, in contrast to certain prior art devices, the diameter $d_1$ 245 of microspine wheel assembly 200 is not constrained by the height of certain objects to be traversed, such as for example, the height of a step or a curb. This aspect is described below in more detail using FIG. 15. Specifically, given the lack of prior knowledge of the type of terrain to be traversed by the terrain traversing device, it is generally desirable that the diameter $d_1$ 245 of the microspine wheel assembly 200 is not constrained by the height of various obstacles. However, it will be understood that in certain applications, it may be desirable to use a small diameter so as to accommodate traversal of certain obstacles such as narrow passageways.

Attention is now drawn to microspine hook 220 of FIG. 2 that is mounted on a flexible suspension 210, which is one of four suspensions shown as parts of mount 235. The mount 235 may be formed in several alternative ways using several alternative materials. For example, in one embodiment according to the present disclosure, the mount 235 is a unitary mount formed as a rigid structure using a material such as a metal or a hard plastic. In another embodiment according to the present disclosure, the mount 235 is formed as a unitary flexible or semi-flexible structure using a rubber-based compound.

In a further embodiment of the present disclosure, the mount 235 and the rotor 205 are fabricated as two separate parts. Subsequently, the mount 235 is attached to the rotor 205 in an arrangement whereby the mount 235 rotates along with the rotor 205 when the rotor 205 is rotated. The attachment may be carried out using suitable attachment mechanisms such as screws, dowels, washers, seals, etc. Alternatively, the attachment can be carried out via a force-fit process. In another embodiment of the present disclosure, the mount 235 and the rotor 205 are fabricated together as a single unitary assembly, for instance through a casting process.

The flexible suspension 210 includes a hook assembly 225 that anchors the microspine hook 220, and further includes two flexible elements that support the hook assembly 225 in a manner that provides a flexing action when the microspine hook 220 engages with an irregularity in a traversal surface. More particularly, flexible loop element 215 couples one end of the hook assembly 225 to a first attachment location 217 along the circumferential edge of the rotor 205. Meanwhile, a stretchable element 216 couples an opposing end of the hook assembly 225 to a second attachment location 218 located on the mount 235.

In an embodiment of the present disclosure, the microspine hook 220 can be composed of a suitable material that permits the microspine hook 220 to be repeatedly engaged and disengaged from hard surfaces without significant damage or wear and tear. One example of a suitable material is a metal such as stainless steel.

The rotor 205, as seen in FIG. 2, may be implemented in various ways using various materials. For example, the rotor 205 may be composed of a hard material (e.g. a metal or a hard plastic) and includes a central opening having a diameter $d_2$ 240 that is selected in order to accommodate an axle (not shown) that is inserted through the central opening. This arrangement may be better understood from FIG. 1, where each of the wheel assemblies 105 and 125 include multiple microspine wheel assemblies arranged in parallel with each other with individual axles (not shown) inserted therethrough.

The multiple holes 207 shown along the annular body of the rotor 205 of FIG. 2 may be used in several ways. In one embodiment of the present disclosure, these holes 207 assist in arranging multiple microspine wheel assemblies on an axle in a manner that provides for an intentional misalignment between the microspine hooks of adjacent microspine wheel assemblies. The intentional misalignment permits each of the plurality of microspine hooks of a first microspine wheel assembly to engage to irregularities in the terrain surface at different engagement instances when compared to engagement instances of the plurality of microspine hooks of a second microspine wheel assembly (which may or may not be immediately adjacent to the first microspine wheel assembly).

The embodiment as shown in FIG. 2 is only one example of the microspine wheel assembly. Furthermore, the above disclosure only provides an initial overview of the fabrication, design and use of the microspine wheel assemblies in devices such as those shown in FIG. 1. A more detailed explanation as to the fabrication, design and use of the microspine wheel assemblies will be provided below.

Figure 3:
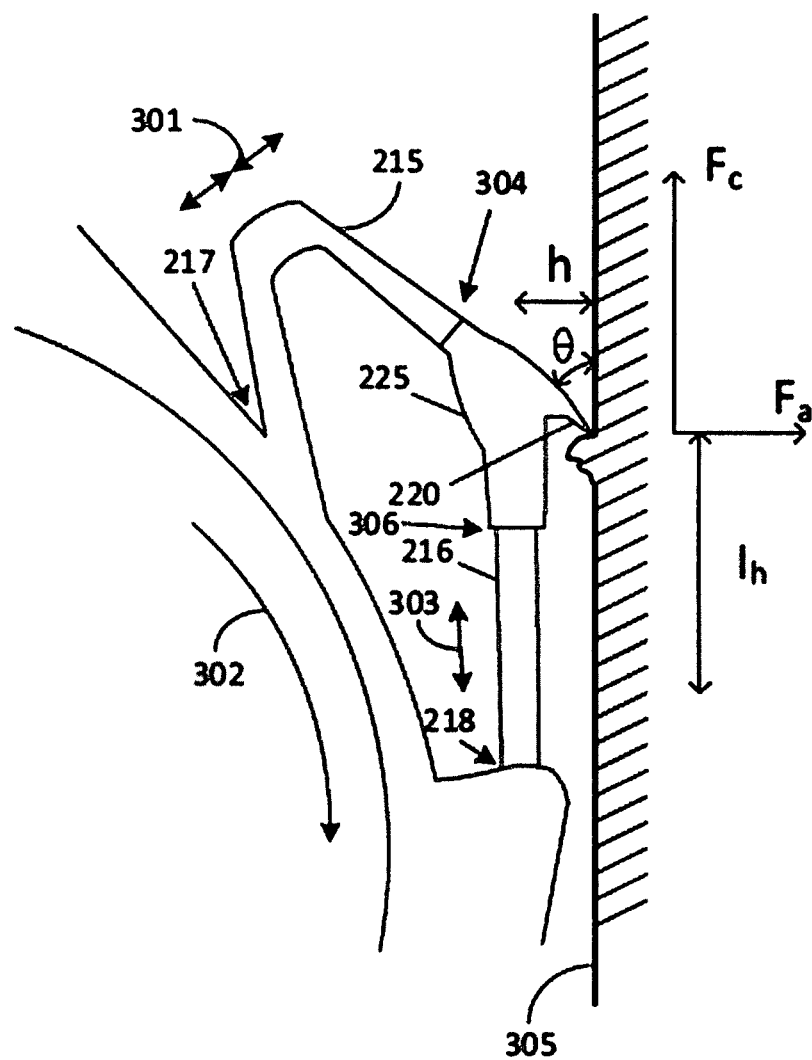
FIG. 3 shows a microspine hook, which is a part of the microspine wheel assembly shown in FIG. 2, engaged to an irregularity in a vertical surface.

Attention is now drawn to FIG. 3, which shows microspine hook 220 engaged to an irregularity in a vertical surface 305. The probability of microspine hook 220 engaging to various irregularities in vertical surface 305 is dependent on various factors, such as the size of microspine hook 220, shape and stiffness of flexure 215, engagement angle "A" (also referred to as an angle of attack) and smoothness/roughness of vertical surface 305.

The flexible loop element 215 flexes bi-directionally as shown by the pair of bi-directional arrows 301 that is indicative of a compression/expansion action on the part of the flexible loop element 215 as microspine wheel assembly 200 rotates in the process of traversing up a vertical surface 305. The compression/expansion action allows the separation distance between attachment location 217 and location 304 to vary, while simultaneously providing other benefits, such as preventing tangling between adjacent microspine wheel assemblies and providing alignment as microspine wheel assembly rotates.

A stretchable attachment 216 accommodates stretching as shown by the bi-directional arrow 303, thereby allowing a separation distance between attachment location 218 and location 306 to vary as the microspine wheel assembly rotates. In addition to providing a stretching action, the stretchable attachment 216 also operates as a load bearing member by bearing at least a part of a weight of the terrain traversing device during certain phases of the rotation of the microspine wheel assembly 200 when the microspine hook 220 is engaged to the irregularity on the vertical surface 305.

The first flexing action provided by the flexible loop element 215 cooperates with the second flexing action provided by stretchable attachment 216 and permits the microspine hook 220 to remain engaged with the irregularity through a larger engagement angle "θ" than would be feasible with a rigidly mounted microspine hook. While the embodiment shown in FIG. 2 shows flexure 215 as a c-shaped joint, in other embodiments, the flexing action can be provided using various other mechanisms using elements such as springs, elastomers, and cantilevers.

However, it is desirable to limit the range of engagement angle θ so as to increase the probability of the microspine hook 220 engaging to various types of irregularities in various types of climbing surfaces. Further details pertaining to desired engagement angle (also referred to as an angle of attack) will be provided below.

The desirable angular displacement θ range is based on two contributory angles, which are based, at least in part, on selecting suitable values for "$l_h$" and "h." Specifically, the microspine hook 220 initially engages to the irregularity at a first contributory angle that occurs when the hook assembly 225 is oriented substantially parallel to the vertical surface 305. This engagement action by the microspine hook 220 is followed by a flexing action (indicated by the pair of arrows 301) of flexible suspension 210 (as a result of rotation of the microspine wheel assembly 200 indicated by arrow 302), which results in angular displacement θ increasing by a second contributory angle.

It will be also pertinent to point out that the engagement characteristic of each individual microspine hook in the microspine wheel assembly 200 is independent of other microspine hooks in the microspine wheel assembly 200. Furthermore, each individual microspine hook, when engaged to the irregularity in the vertical surface 305, can retain their grip even when the terrain traversing device 100 is deprived of a power source allowing the terrain traversing device to stay in place indefinitely, even on vertical walls.

In contrast to the engagement characteristics described above, disengagement of the microspine hook 220 from the irregularity on the vertical surface 305 automatically occurs as a result of a decrease in the engagement angle θ towards zero when the microspine wheel assembly 200 rotates in order to climb up the vertical surface 305. Further discussion concerning the engagement angle (or angle of attack) will be provided below.

Figure 4A:
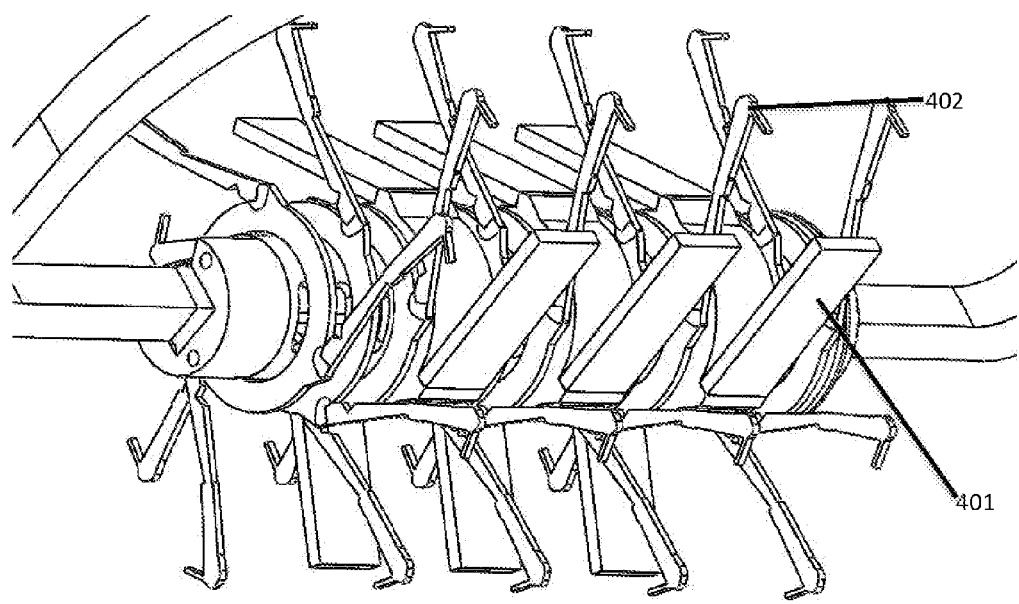

In a further embodiment of the microspine wheel assembly as seen in FIG. 2, FIG. 4A shows that adhesive materials 401 can also be used between the microspines 402 to further improve climbing performance and expand the number of surfaces that can be climbed. By placing flaps of adhesive material 401 interstitially (or adjacent to) the microspines 402 in a microspine wheel unit, alternative embodiments of the wheels can be created which have additional adhesive forces for walls which would help the microspines engage the surface or support climbing entirely on their own. Examples of this adhesive material include electrostatic or electroadhesive materials, fibrillar adhesive pads, pressure sensitive adhesive pads (tape), and electro-or permanent magnets.

Figure 4B:
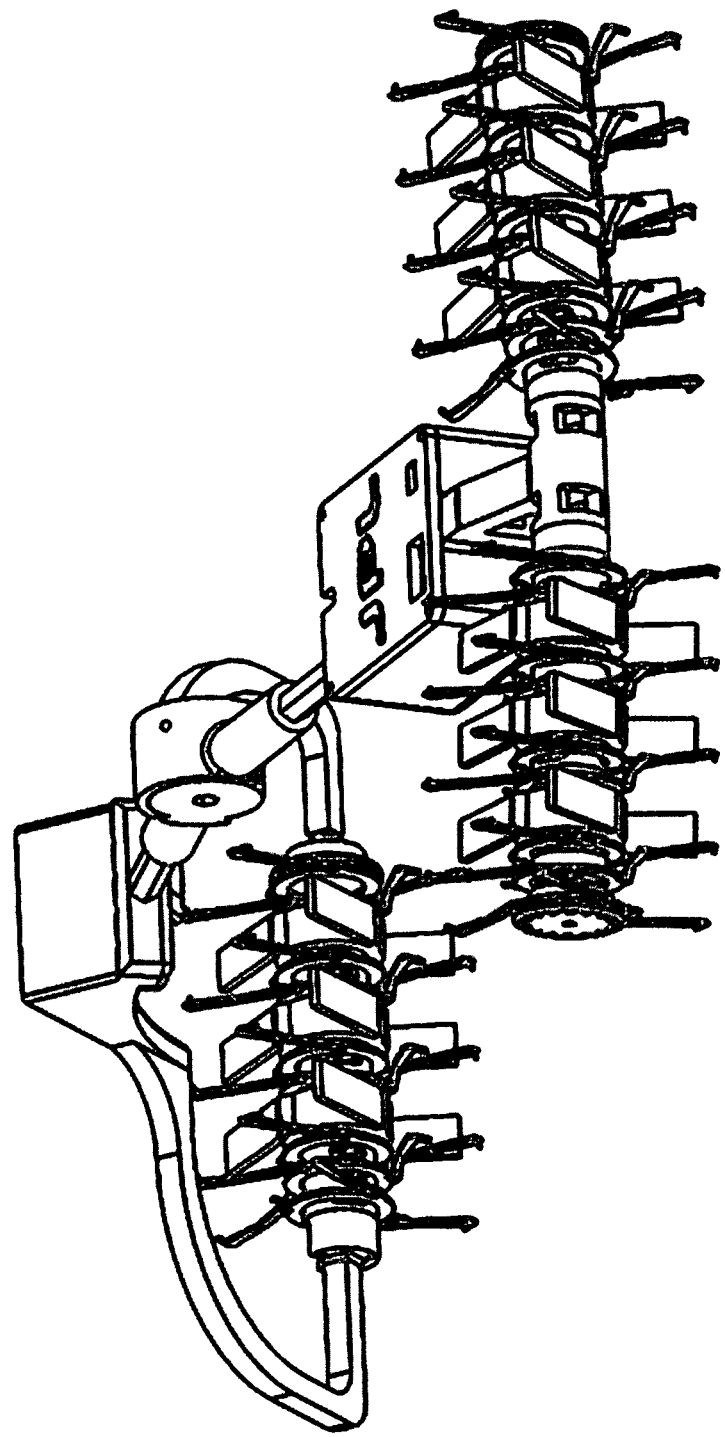
FIG. 4B shows an embodiment using the hybrid microspine wheel assembly.

An embodiment according to the present disclosure using the "hybrid" model of microspines and adhesive material (as seen in FIG. 4A) can be seen in FIG. 4B. Although the use of the adhesive materials may increase the weight and complexity of fabrication of such wheels, it can provide additional capabilities such as traversing smoother vertical surfaces. In particular, the different adhesive mechanisms are included in such a manner as to work in a complementary manner (with similar bending characteristics) and allow the mechanisms to work together and not get into each other's way.

The above disclosure provided descriptions concerning an overall understanding of the microspine assembly. It will now be detailed, particular aspects of the microspine assembly concerning the fabrication, design and use in a variety of different embodiments.

Detailed Fabrication Methods for the Microspine Wheel Assembly

The microspine wheel assemblies of the present disclosure can be fabricated any number of different ways. For example, depending on a cure time for polymers being used in the fabrication of a rotary microspine assembly, a set of rotary microspines could be designed, fabricated, installed and tested within one day. Therefore, for an embodiment of the present disclosure, an iterative empirical approach to microspine development that was both practical and could yield significant improvements in the performance of the climbing robots was desired. A selected approach used in this application includes parallel development paths which were often pursued to test out multiple different strategies for a design of the rotary microspine. Such approach is further detailed below and can be seen, for example, in FIG. 5.

Figure 5:
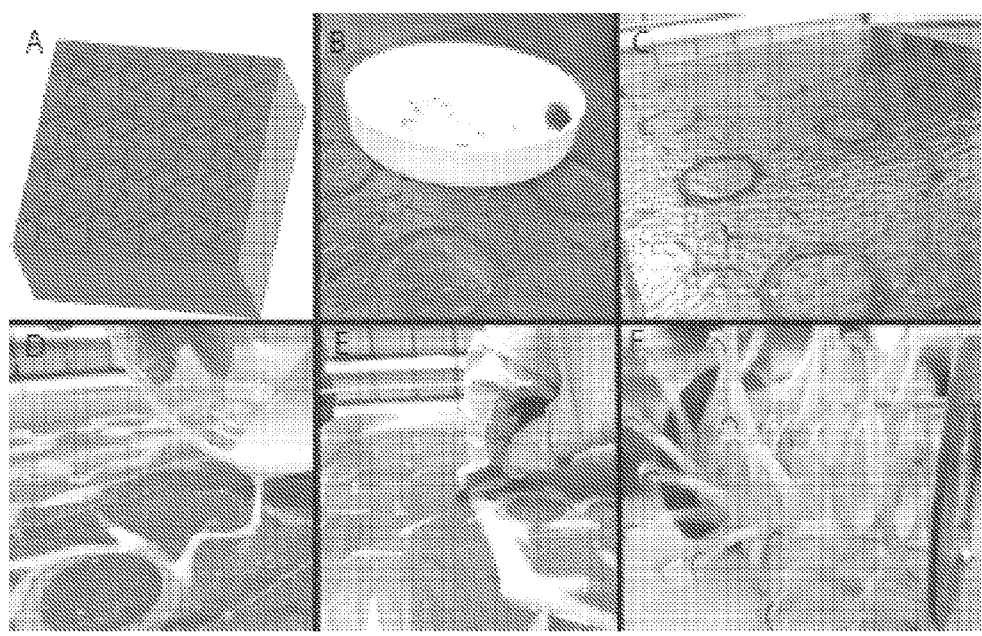
FIG. 5 shows steps of the shape deposition manufacturing (SDM) used in fabricating various embodiments of microspine wheel assemblies according to the present disclosure.

As seen in FIG. 5, prototypes of the rotary microspine were made using shape deposition manufacturing. This iterative process uses sequential steps of milling and casting to create multi-material parts with embedded components (e.g. the microspine hooks).

With respect to shape deposition manufacturing, a mold for the axle, hook housing and hook are first cut in a sacrificial blue wax using a computer controlled milling machine (see panel A of FIG. 5). The hooks are then placed into specified positions (see panel B of FIG. 5). Next, a rigid urethane is cast into the mold. Excess urethane collects on top of the wax (see panel C of FIG. 5). The block is then placed back into the milling machine and planed down to its original level.

The mold for the flexures is then cut, removing both wax and rigid urethane as necessary. Afterwards, the flexures are cast using flexible urethanes. The urethanes bond to one another during the curing process. Excess material is squeegeed off the surface (see panels D and E of FIG. 5) prior to curing. Next, the block is returned to the machine and mounting holes are cut into the axle.

Finally, rotary microspines can then be removed from the wax block by using a sharp edge to release them from the mold. The microspines are then assembled into a wheel using threaded rod and spacers as necessary (see panel F of FIG. 5).

For the method described above, the sacrificial wax block can be planed down to expose a clean surface and reused. Although details relating to fabrication of the microspine wheel assemblies pertained to a particular method (e.g., shape deposition manufacturing), any number of other methods may also be used including 3D printing and traditional mass-production technologies. For example, more traditional factory processes may be used to create the microspine wheel assemblies such as insert molding, injection molding, stamping, casting, and other such methods may be used if fabrication of the microspine wheel assemblies increases/scales up.

Material Properties for the Microspine Wheel Assembly

As mentioned above, shape deposition manufacturing allows a wide range of material properties to be obtained in different embodiments where such material properties of the components can dramatically affect the performance of the microspine wheel assembly. For example, the material property for the flexure can affect the bending stiffness and the resistance of the spine housing from twisting out of plane. Similarly, a wide range of choices of materials are possible with the other manufacturing methods mentioned above.

Materials that have elasticity may be desired which would allow multiple hooks to grip the surface at one time while under the load of the robot. Furthermore, since the flexure undergoes repeated bending and axial loads, the longevity of the wheel unit is also a concern. A material that does not wear quickly, strain harden, or otherwise change properties after a few uses is also desired.

Another property of the materials is viscoelasticity, which can affect a flexure design by dampening any bounce back of the hook off the wall after impact. However, if the materials possess too much viscoelasticity, the flexure may not return to its original shape in time for a subsequent contact as the wheel units rotate on the surface (e.g., up a wall). Furthermore, viscoelasticity relates to the flexure materials as this may cause the wheels to deform during storage if the flexures were under load.

For various embodiments of the present disclosure, soft urethane rubber materials with Shore A hardness of 40 A to 60 A stretch and allow multiple hooks to share the weight of the robot. These materials were previously used in linear microspines but were too soft to hold the metal spine necessitating the rigid plastic spine housing. The bond between the two materials was often the failure point resulting in the housing ripping off the flexures over time. The soft material was also prone to buckling out of plane and had difficulty providing sufficient bending stiffness to engage the spines.

Designs with the above materials required a back flexure to support the hook housing. However the use of the back flexure could result in entanglement of neighboring spines. As discussed here and later on in the disclosure, entanglement of the microspines is not desired because it renders all the involved microspines less effective. Furthermore, such condition can also result in the terrain traversing device to slip and fall. Although dividers could be used between each microspine to reduce the effect of entanglement, the dividers would dramatically increase the weight of each of the wheels.

In different embodiments of the present disclosure, stiffer urethane rubber materials with Shore A hardness of 60 A to 95 A were also used. These embodiments provided appropriate bending stiffness and improved torsional stiffness. The hooks were adapted to be embedded directly into the flexure material and would not rip free during normal use. Furthermore, a back flexure was not necessary for these embodiments.

It should be noted that viscoelasticity varies widely among different brands of urethane in the above category (Shore A hardness of 60 A to 95 A) and were often difficult to predict from the material properties listed on data sheets. However, embodiments using stiffer rubber were able to be cast entirely from one material making them much more desirable from a mass-manufacturing perspective.

Metals provide good torsional stiffness and good strength to weight ratio which would make them good candidates as flexure materials. However, in an embodiment where spring steel flexures were used, work hardening and plastic deformation arose as potential problems when not properly designed.

Alternatively, nitinol flexures were used in different embodiments. These embodiments did not exhibit the above drawbacks of the spring steel flexures. However, these embodiments using nitinol were more difficult to crimp which could result in flexures being pulled out of the plastic spine housing over a course of several uses when not appropriately anchored to rotor.

Figure 6A:
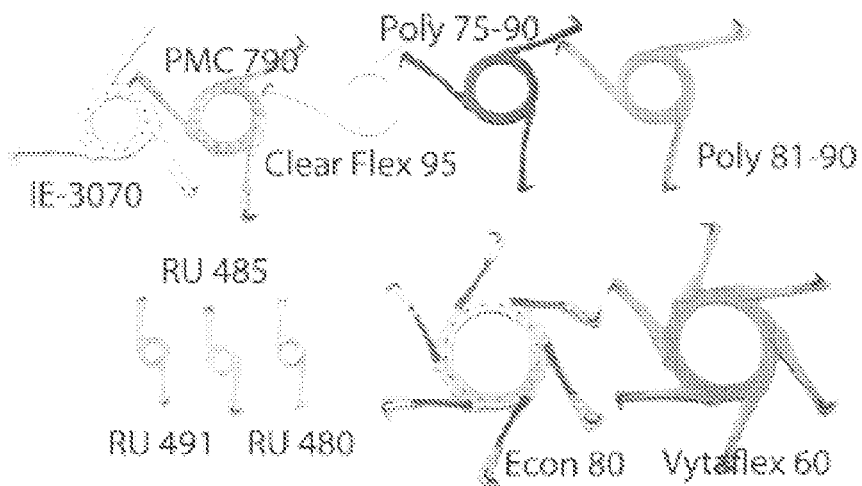
FIGS. 6A-6C show several designs of different embodiments of microspine wheel assemblies.
Figure 6B:
Figure 6C:
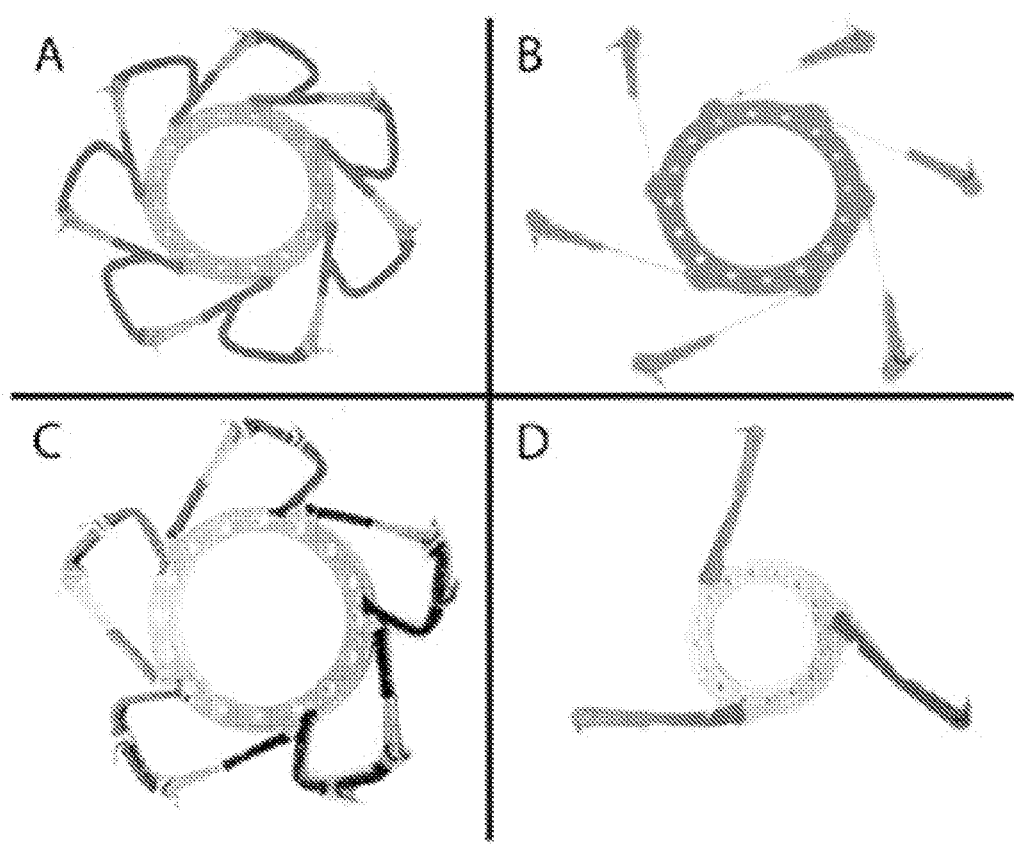

Examples of microspine assemblies discussed above can be seen in FIGS. 6A, 6B and 6C. With respect to 6A, tested urethane polymers of Shore A hardness from 60 to 95 can be seen. With respect to 6B, embodiments of microspine wheel assemblies using metal wire flexures (e.g., steel and nitinol) are shown.

With respect to 6C, rotary micropsine development hierarchy is shown. As seen in panel A, an embodiment utilized seven flexures. This was possible by connecting the back flexures to the trailing flexure's front flexure. This provided a reaction against the push during loading of the back flexure which causes the front flexure to bend pushing the spine into the wall. Panels B-D show other embodiments of microspine wheel assemblies using different numbers of flexures, materials, and flexure designs.

Intro—Detailed Design Considerations for the Microspine Wheel Assembly

Described in further detail below, a rotary microspine assembly can be made of a variety of materials each having different properties. Such variations in material properties can arise between the axle, the spine housing, the flexures, and the spines. Furthermore, out of plane forces (into the page for FIGS. 6A-6C) and torques arising between interactions of the assembly and the surface further complicate such models. Therefore, it can be difficult to model a rotary microspine accurately.

A microspine wheel can consist anywhere between one and hundreds of individual rotary microspines working together in a probabilistic manner. Of these microspines, as few as one or two micro spines must catch an asperity of the surface in order to support the weight of the terrain traversing device the device travels over the surface (e.g., vertically up a wall).

Although individual elements of the rotary microspine can be modeled (as discussed below) to provide insight into design choices, a comprehensive model is still being sought.

Figure 7A:
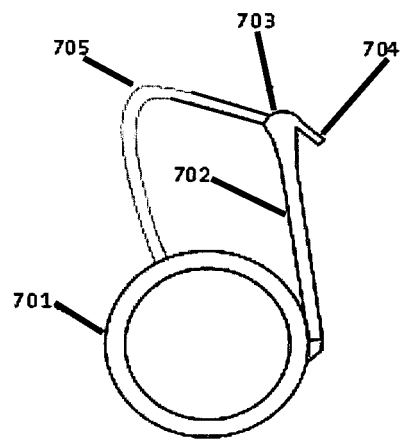
FIG. 7A shows component designation for an embodiment of a microspine wheel assembly and FIG. 7B shows important design parameters of a single microspine wheel assembly.

With reference to FIG. 7A, component designations of a single wheel unit can be seen. The single wheel unit maybe one of a plurality of units which make up a microspine wheel assembly (such as the one seen in FIG. 2).

As seen in FIG. 7A, a rotary microspine consists of a hard inner rim 701 with one or more flexures 702 connected tangentially. Each flexure terminates in a sharp hook/claw (sometimes referred to as a spine) 704 that is held in a hook housing 703. The tangential attachment allows the microspine to load as soon as the hook 704 has engaged an asperity on the surface. The hook housing 703 provides a rigid mounting piece that holds the hooks 704 and interfaces the hooks 704 to the flexure 702.

Figure 7B:
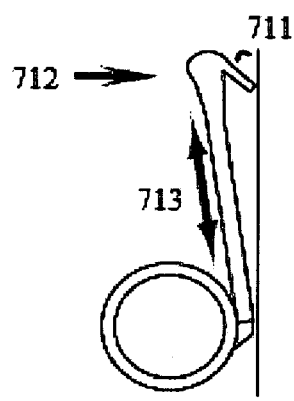

Several important design parameters are shown in FIG. 7B. Such design parameters include the angle of attack 711, the flexure length 713 and the bending stiffness 712. In particular, when we refer to the angle of attack, such term makes reference to an angle the microspine makes with a surface on first contact. Additionally, we define the bending stiffness as a spring force exerted by the flexure that pushes the axle away from the surface as the rotary microspine device rolls. This bending stiffness depends on both a geometry and material properties of the flexures.

The flexures used in the microspine assemblies are designed to bend in plane in order to minimize any out of plane rotation or movement. Alternative embodiments are possible where a "C-shaped" back flexure is used. An example of such a back flexure can be seen in FIG. 7A (denoted as 705). The use of back flexures provides additional torsional stability to the spine housing. However, the use of the back flexure also increases the bending stiffness of the flexure.

Figure 11:
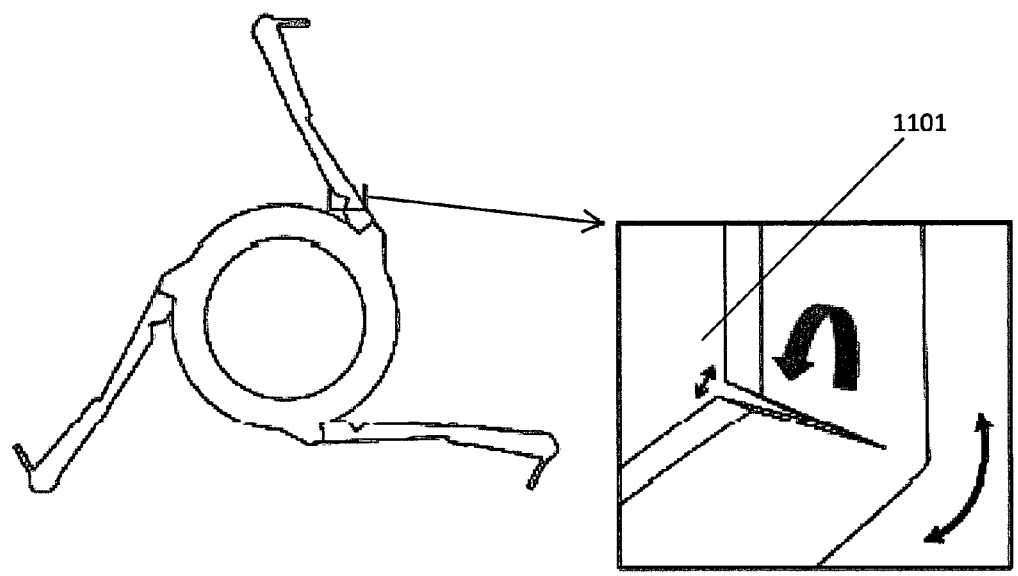
FIG. 11 shows an exemplary illustration of a microspine wheel assembly where flexures have an in-plane bending biasing design.

Also another embodiment of the flexures, discussed further in detail below, may also be flexures with notched geometry 1101 (see FIG. 11). Such notched geometry 1101 would promote plane bending of the flexure and counter twisting out of plane.

Further details will now be presented concerning the different design characteristics and the effects on the microspine wheel assembly.

Design—Angle of Attack

One characteristic of concern for designing a microspine wheel assembly is the angle of attack 711 (or engagement angle θ). We define the term "angle of attack" as relating to an angle at which the spine comes in contact with a surface (e.g., a wall) as seen above in FIG. 7B. The angle at which the spine is orthogonal to the wall is considered 90°.

Figure 8:
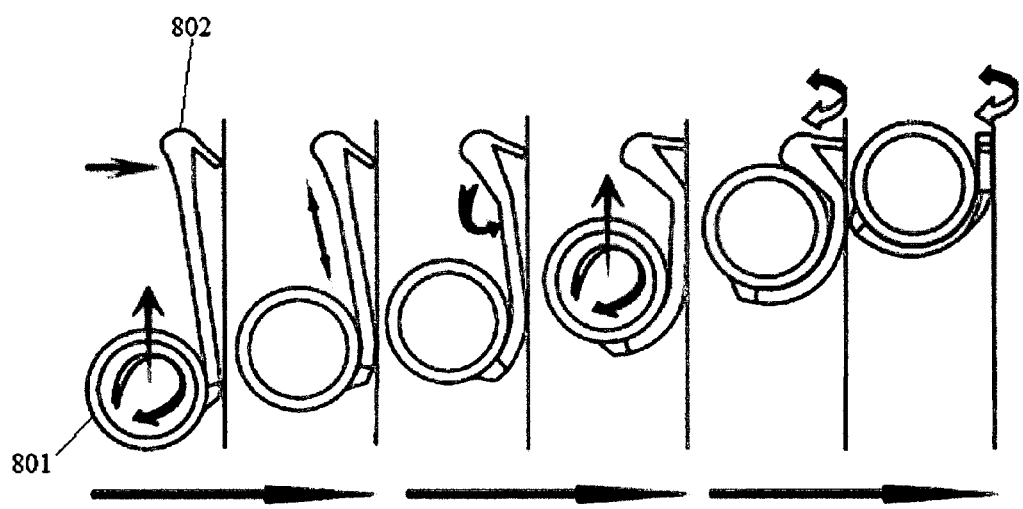
FIG. 8 shows an example climb sequence for a microspine.

A typical climbing sequence for a microspine wheel assembly can be seen in FIG. 8. In FIG. 8, one can see the wheel 801 as the wheel 801 rotates and travels up the surface (e.g., a wall) with respect to the relationship of the flexure 802. As the wheel rotates, an instantaneous angle of attack will rotate from an initial contact angle through to 0°. In one embodiment, an initial angle of attack was chosen to be 35°. However, it was noted that a small initial angle of attack (e.g., 35°) performed poorly in a rotary configuration. In particular, the angle of attack quickly rotated to near-zero state (corresponding to the spine being parallel with the surface) thereby making the microspine ineffective in gripping the surface. Furthermore, the quick rotation can be exacerbated if the flexure is too short or if a back flexure was used.

It should be noted, with respect to the angle of attack, that if an angle of attack is too low, the microspine would skip along the wall without engaging the surface asperities. However, when the angle of attack is too high, a rotation of the spine during the lift phase would cause the angle of attack to go beyond orthogonal which would result in slipping and detachment.

In other embodiments of the present disclosure, different angles of attacks were also used to determine a more optimal value. Results of the various embodiments can be seen in Table 1. In particular, Table 1 presents results for three such angles (55°, 70° and 85°).

TABLE 1

| 90 Degree Wall Climbing Results (Inches Climbed Per Fall) | | | |
|---|---|---|---|
| | 55° | 70° | 85° |
| Test Wall | 13.68 in | 14.06 in | 7.6 in |
| Building 305 | 4.8 in | 4.53 in | 4.59 in |
| Building 318 | 5.73 in | 7.09 in | 5.6 in |
| Total Inches/Fall | 8.07 in | 8.56 in | 5.93 in |

In the various embodiments represented in Table 1 above, a wheel was assembled with identical number of microspines and tested using a single wheel robot platform. The test articles used VYTAFLEX® 60 urethane rubber for the flexures and also used an additional back flexure. The single wheel robot was then used on three different brick walls where measurements were taken of the total height the single wheel robot would climb before slipping and falling. Averages across fifteen attempts were taken for each case and across each of the three walls. It was found that an angle of attack near 70° was desired as having the most favorable results. In other embodiments where the back flexure was not used, sensitivity to a poor angle of attack increased but the high performance near 70° remained consistent.

As seen in FIGS. 9A-9D, an illustration of a number of reasons or failure modes are provided as to why a terrain traversing device may slip and fall. In particular, these illustrations provide examples as to why a platform may slip and fall while traversing a surface (e.g., wall). In FIG. 9A, an angle of attack is too large which allows the spine to pass orthogonally. In FIG. 9B, too much bending stiffness is present which creates forces that push the terrain traversing device off the wall. In FIG. 9C, too little bending stiffness is present and the microspine scrapes superficially across the surface, allowing the spine to stretch pass orthogonal and twist out of plane. This results in the microspine never catching onto an asperity. Lastly, in FIG. 9D, insufficient torsional rigidity in the microspine allows twisting of the microspine out of plane.

With reference to the angle of attack, FIG. 9A illustrates a scenario where the angle of attack is too high, which would result in the spine stretching past orthogonal and twisting out of the plane. In this situation, the spine would not catch an asperity of the surface (e.g., wall).

Design—Flexure Length

Another parameter of concern is the flexure length. The flexure length refers to the length of the primary, tangential flexure that extends from the axle. This is identified in FIG. 7B.

As the wheel assembly rolls on the surface (e.g., up a wall), the flexure length sets the linear distance along which any individual microspine may be engaged with the surface. Because the flexure must wrap around the axle as the wheel progresses, this flexure length is limited to the circumference of the axle divided by the number of flexures used in the design.

In a number of embodiments, when the terrain traversing device utilizing the microspine wheel assembly has a low mass, one adhered microspine can support the entire weight of the terrain traversing device. However, consistent loading of the microspines is desired in order to ensure smooth, continuous movement across a surface (e.g., climbing up a wall).

Falls can occur when the weight of the terrain traversing device is transferred from one adhered microspine to the next. Softer flexures stretch to share the load of the terrain traversing device between multiple spines, smoothing the transition. However, these soft materials are also more prone to twisting out of plane or rotating. Such twisting out of plane or rotating causes detachment as shown in FIG. 9D.

On the other hand, stiffer flexures resist twisting but create more sudden transitions between one spine and the next since the flexure has not stretched and shared the load of the terrain traversing device. In embodiments where metal flexures (which can be generally considered inextensible for this context) are used, transitions can be discontinuous between the stick/slip events. As referred here and through the present disclosure, stick/slip events correspond to the transitions of the spines (from grabbing onto surface asperities and letting the asperities go) as the terrain traversing device travels across a surface. When a spine is engaged with the surface, the terrain traversing device can move smoothly. However, when the spine releases, there may be a sudden slip as transfer of the weight goes from one spine to another. This is also the situation where the terrain traversing device can also fall if the slip is too great for the new spine(s) to bear.

Using longer flexure lengths with stiffer, but not rigid, flexure materials was found to increase climbing performance by reducing a number of these stick/slip events per distance traveled. However, the increasing of the flexure length also reduces the number of spines that can be used and also introduces the chance for entanglement between microspine assemblies. As discussed above, the chance for entanglement can be minimized, for example, by implementing dividers, wider side by side spacing between microspines or providing more rigid flexures.

Design—Bending Stiffness

Figure 9:
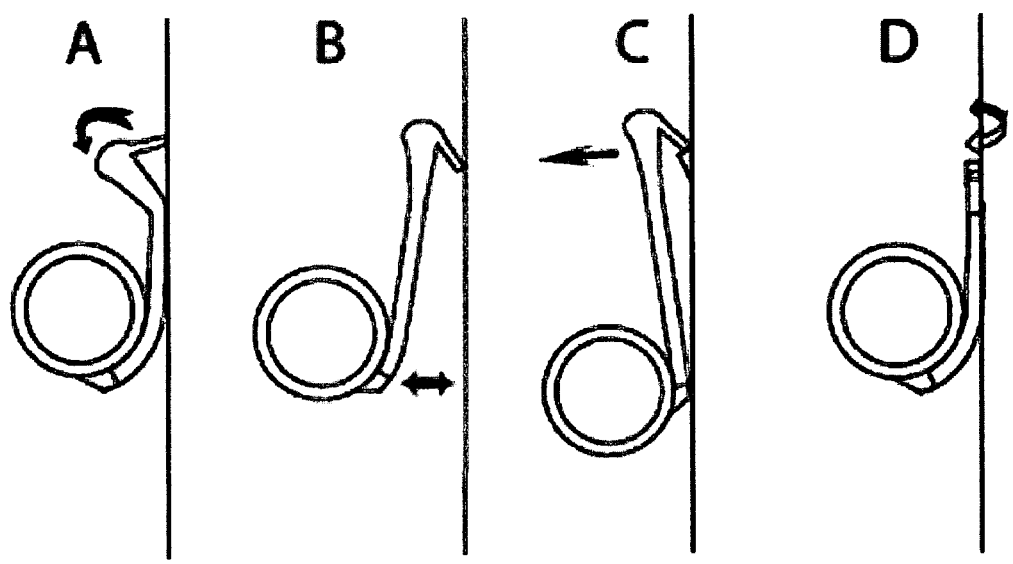
FIG. 9 shows exemplary illustrations of failure modes a microspine can experience with a vertical surface.

The bending stiffness of the flexure is the force with which the flexure resists deflection as it is wrapped around the hub of the microspine wheel assembly. The bending stiffness is determined by the shape and material properties of the flexure. Of all the dominant modes of failure which are illustrated in FIG. 9, FIGS. 9B and 9C are specifically related to bending stiffness.

With respect to FIG. 9C, insufficient stiffness can cause microspines to scrape superficially along the surface and never engage the asperities of the surface. With respect to FIG. 9B, too much bending stiffness will result in the terrain traversing device being pushed off the wall. In this latter situation, greater torque from the motor to wind the flexure and an increase in the adhesion required at the spine since the center of gravity of the terrain traversing device being further away from the wall attribute to the failure mode seen in FIG. 9B.

Analysis of the flexure can give an estimate of the bending stiffness. Summation of these forces across a wheel can inform the number of microspine wheel units to use within a wheel. Furthermore, it can also inform design changes to increase or reduce the bending stiffness desired for an embodiment. By using a simple model, a flexure can be viewed as a cantilevered beam fixed where the spine is engaged on a wall and loaded by the platform/robot at the axle.

Figure 10A:
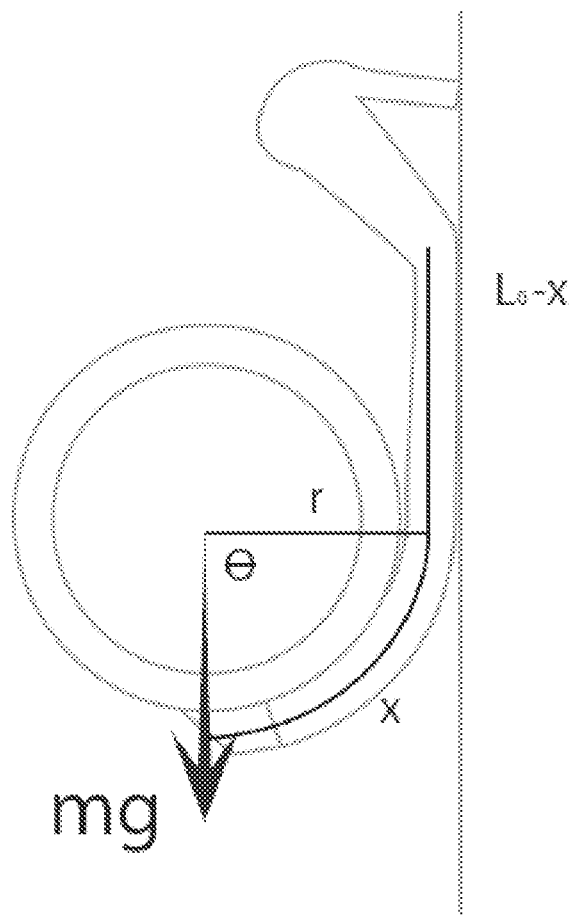
FIGS. 10A and 10B show simple models of microspines used for calculating corresponding forces acting on the microspine.
Figure 10B:
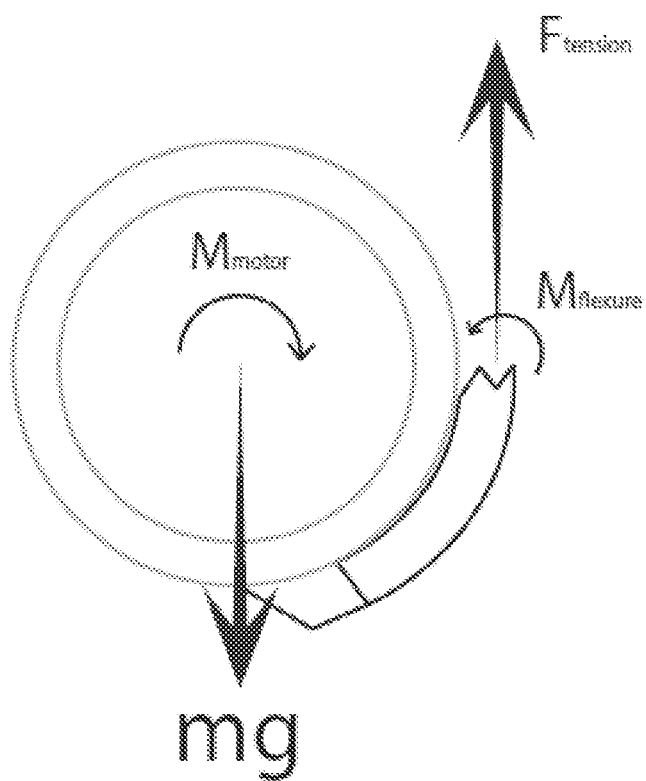

As seen in FIG. 8, corresponding to a desired climbing mode, such figure shows that the flexure must wrap around the fixed radius of curvature of the hub. By using the Euler beam bending theory as a simple model and taking the applied moment case as seen in FIGS. 10A and 10B, one can use Equation 1 to solve for the forces:

$$\Theta = \frac{ML}{6EI} \tag{1}$$

With reference to Equation 1, theta is the central angle in radians, M is the applied moment, E is the elastic modulus, L is the wrapped beam length, and I is the area moment of inertia.

Equation 1 can be rearranged as seen below in Equation 2:

$$M = \frac{6EI\Theta}{L} \tag{2}$$

One of ordinary skill in the art would know that theta equals the arc length over the radius. There, the equation for a spine partially wrapped can be simplified from Equation to Equation 3 below:

$$M = \frac{6EI}{r} \tag{3}$$

With reference to Equation 3, r is the radius of the hub. Because r remains constant, each spine in contact will create an equal reaction moment independent of the amount of wrap.

The maximum moment that can be imparted by the sum of the flexures in contact with a wall is shown in Equation 4:

$$M_{flexures} < \frac{(M_{Motor} - mgr)}{n} \tag{4}$$

Equation 4 can be viewed also below as Equation 5 for design purposes:

$$nEI < \frac{r}{6}(M_{Motor} - mgr) \tag{5}$$

With reference to Equations 4 and 5, n is the number of wheel units, E is the elastic modulus and I is the area moment of inertia.

A single flexure length cannot be greater than the circumference of the hub and still fully extend after the spine disengages. Individually, the flexures should not interfere with each other. As a maximum amount of wall adjacent spines is desired, we can represent this relationship below in Equation 6. This equation shows that there will always be a single flexure in contact with the surface per wheel unit.

$$L_{flexures} = \frac{\pi D}{n_{flexures}} \tag{6}$$

The circumference of the hub divided by a number of chosen flexures gives the length of the flexures. This means that the amount of force exerted by the flexures is equal to the number of wheel units.

By taking the elastic modulus of a material and by choosing a number of wheel units, the area moment of inertia can be determined for a given hub and motor configuration Likewise, with a given area moment of inertia, a maximum number of wheel units can be determined. These considerations will help minimize and avoid the failure mode illustrated in FIG. 9B.

Design—Torsional Stiffness

Torsional stiffness corresponds to the failure mode illustrated in FIG. 9D where the flexure twists out of plane. It is desired that flexures be resistant to twisting out of plane. If out of plane twisting occurs with a microspine, the microspine may not interact with asperities of the surface as intended which would prevent the spine from fixing onto the asperities (possibly causing a slip or fall of the terrain traversing device).

Because a roughness of the surface is varied, the asperity which a hook makes contact with will likely have an angle out of plane with respect to a microspine. If an embodiment has a 45° angle as a chosen maximum usable surface angle out of plane, then the component of the contact force that would be transmitted into torsion (twisting of the flexure) can be calculated.

By using Equation 7, below, and choosing an initial twist out of plane as desired, one can calculate the second polar moment of area and an approximate minimum geometry to meet these specification for a chosen material. By considering these characteristics, minimizing the failure illustrated in FIG. 9D is possible.

$$J = \frac{TL}{\Theta G} \quad (7)$$

With reference to Equation 7, J is the second Polar Moment of Area, theta is the angle of twist in radians, T is the applied torque, L is the beam length and G is the sheer modulus of the material.

Also of concern is a minimum bending stiffness to keep the flexure in contact with the wall. Such determination thus far has been accomplished empirically through trial and error because the impact forces and dynamic and an accurate predictive model has not yet been developed.

In other embodiments of the present disclosure, a bias can be introduced using a notched geometry 1101 for the flexure to promote in plane bending of the flexure and counter twisting out of plane. Such bias via use of a notched geometry 1101 in the flexure can be seen in FIG. 11. While the notch does create a stress concentration that can cause a flexure to rip, embodiments can overcome this by using high tear strength rubbers.

Spine Density

The spine density of a wheel is a function of the number of flexures per microspine and the proximity of adjacent microspines within a microspine wheel assembly. Density can be increased within a rotary microspine by shrinking the size of the flexures, using more of flexures or using different innovative designs that use multiple microspines on a single flexure.

Increasing spine density improves the likelihood that a spine will always be in position to engage an asperity. However by increasing spine density, some trade-offs may occur including: shorter flexures, added weight, possible entanglement, increased cost and increased manufacturing time.

On smoother surfaces, an increase in the number of microspines can improve performance because many more microspines will be able to partially adhere to the surface thereby carrying the weight of the terrain traversing device. However, with the potential shortening of the flexure length (with the increased number of microspines), performance on rougher walls can be limited more dramatically. Smoother walls can also be traversed using the hybrid wheel design shown in FIGS. 4A and 4B and described above.

In an embodiment of the present disclosure, an increase of the number of spines was performed by adding a spine to the back flexure. This spine on the back flexure would bend up as it was being pushed back by the wall and allows the upper spine to engage. This embodiment can be seen in FIG. 6C (embodiment shown in box C). However, with respect to such embodiment using a spine on the back flexure, unless the front microspines adhere to the wall, the back flexure may not bend and engage the upper spine. The upper spine was also found to have a lower weight bearing ability compared to the front spine. However, it was noted that the double spine configuration did have favorable wall climbing capabilities.

Sweep Angle

Figure 12:
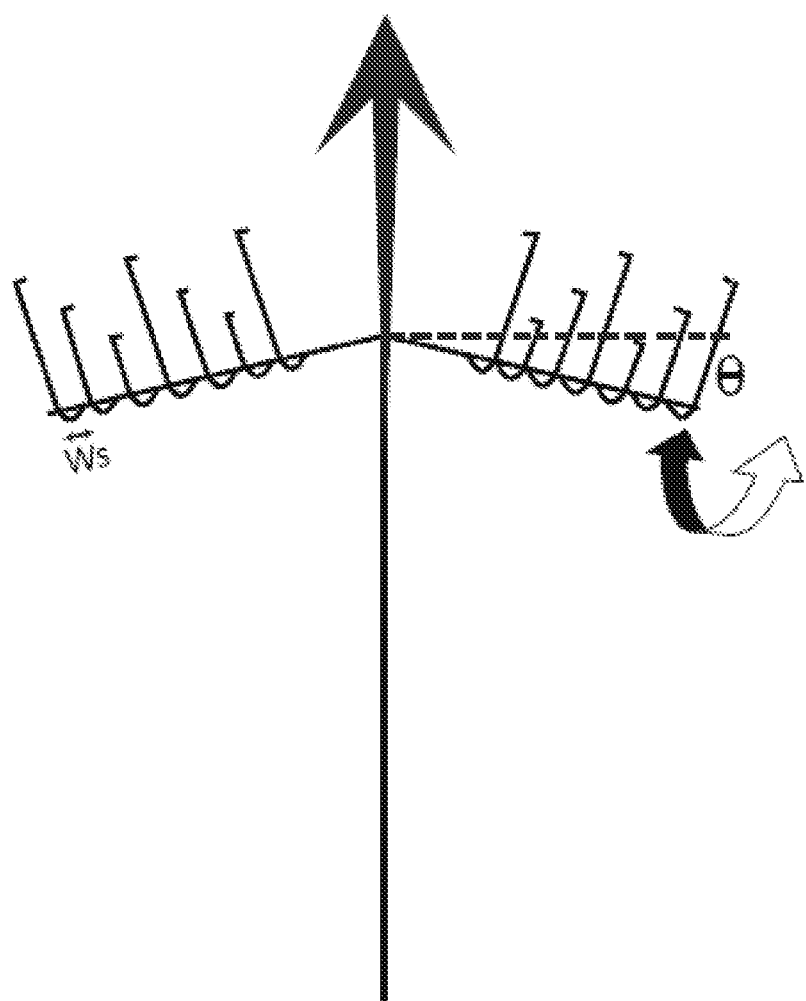
FIG. 12 shows an exemplary illustration of sweep angle parameters.

A sweep angle of the terrain traversing device refers to an angle at which the wheels are mounted with respect to a center housing of the device causing either an arrow or chevron shape as seen, for example, as an embodiment illustrated in FIG. 12. An angle of 0° indicates that the two wheel axes are parallel and orthogonal to the center housing. Negative sweep angles create an arrow shaped platform (as seen in FIG. 12) while positive sweep angles create chevron shaped platforms.

By using non-zero sweep angle, as seen in FIG. 12, such a configuration creates a slight gripping effect between the wheels, allowing the terrain traversing device to steer on the surface (e.g., a wall) and have a larger non-vertical heading. These configurations also produce a reaction torque reaction in each of the wheels that help a wheel that has slipped off the wall to be pushed back onto the surface and reengage. This behavior creates a passive slip-correcting behavior. An angled wheel can also help the terrain traversing device overcome large horizontal obstacles like grout lines on brick buildings.

The gripping force between the wheels and the force created in the direction of climbing can be determined using trigonometry as shown below in Equations 8 and 9. In particular, these equations describe the force that goes into squeezing the wheels together as the sweep angle changes and also the force pushing the device up the surface (e.g., a wall).

$$F_{Climb} = \frac{T}{r}\sin\Theta \quad (8)$$

$$F_{Squeeze} = \frac{T}{r}\cos\Theta \quad (9)$$

Because the wheels are rotating at an angle to the direction of climbing, the flexures spiral on the hub rather than nest in plane. To account for the spiraling action of the flexures and prevent interference with adjacent microspines, a minimum spacing between wheel units is needed. Equation 10 illustrates the spacing that is desired.

$$W_S = \frac{L_{flexure}}{\tan(90 - \Theta)} \quad (10)$$

To determine the most effective sweep angle, tests were done using identical wheels but with varying sweep angles from +15° to −15° in 5° increments. The results are shown in Table 2 below.

TABLE 2

Sweep Angle Wall Climbing Results (Average climb per fall over 15 trials)

|  | Wall-Sweep Angle | | | | | | |
| --- | --- | --- | --- | --- | --- | --- | --- |
|  | 15° | 10° | 5° | 0° | −5° | −10° | −15° |
| Test Wall | 40 in | 44 in | 44 in | 45 in | 45 in | 37 in | 0.1 in |
| Building 305 | 19 in | 20 in | 12 in | 14 in | 21 in | 25 in | 18 in |
| Building 318 | 15 in | 11 in | 25 in | 37 in | 44 in | 48 In | 17 in |
| Total Inches/Fall | 75 in | 75 in | 81 in | 97 in | 111 in | 110 in | 35 in |

A −10° sweep angle showed the best climbing performance. However, the condition also struggled with transitioning from a horizontal to vertical surface because a limited number of micro spines could reach the vertical wall at the transition point from the horizontal surface. Therefore, the −5° sweep angle was used for many of the platforms as it showed similar climbing performance and had a superior ability to transition from flat ground to the wall when compared to the −10° sweep angle.

Overview of Various Embodiments of the Microspine Wheel Assembly Platforms

A variety of configurations were assembled and tested on several types of terrain. These terrain traversing devices were manufactured using rapid prototyping processes including selective laser sintering, fused filament fabrication, shape deposition manufacturing, and laser cutting of acrylic. A number of embodiments according to the present disclosure use off the shelf electronics developed for the remote control hobby-airplane market because of their low cost, small packaging, and light weight. In particular, some embodiments use lithium polymer batteries, a microprocessor, and a radio receiver that allows teleoperation using a 2.4 Ghz remote control unit (transmitter).

Figure 13:
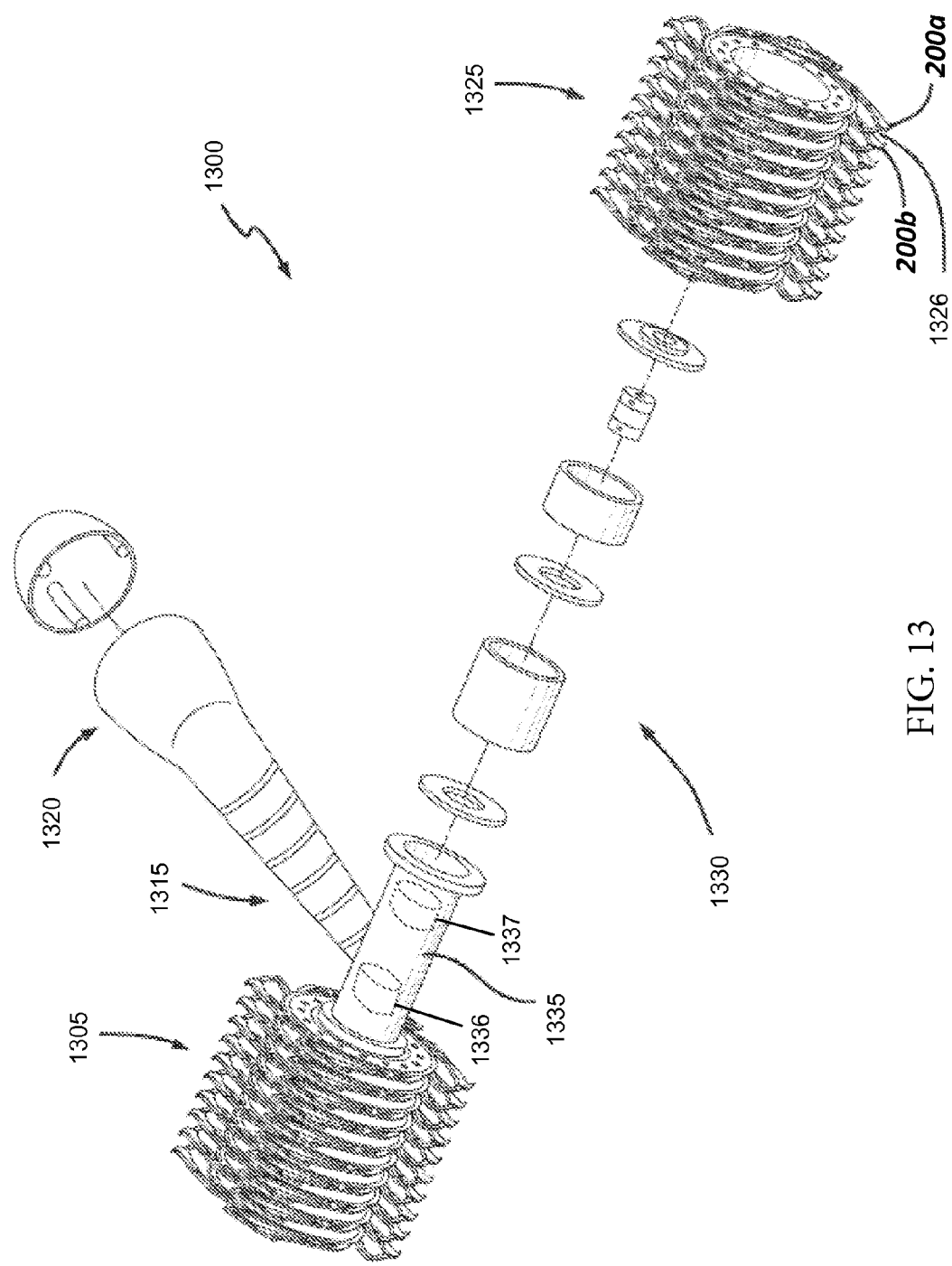
FIG. 13 shows an exploded view of a terrain traversing device that illustrates a few component parts according to an example embodiment of the present disclosure.

Reference is now made to FIG. 13 which shows an exploded view of an embodiment of a terrain traversing device. In particular, the Durable Reconnaissance and Observation Platform (DROP) further described below, is shown. It should be understood that such illustration is only an embodiment of the terrain traversing devices of the present application and that other configurations (further described below) are also possible.

With reference to FIG. 13, the figure reveals a few component parts of such embodiment of the terrain traversing device 1300 in accordance with the present disclosure. It will be understood that some of the components referred to below are not shown in the drawing because people of ordinary skill in the art will readily understand the nature and characteristics of these components.

In the embodiment shown in FIG. 13, axle 1330 includes a central housing 1335 in which is housed one or more motors for driving wheel assemblies 1305 and 1325. In one embodiment, a first brush motor 1336 and a second brush motor 1337 are housed in central housing 1335, with each motor individually driving a respective wheel assembly 1305 and 1325. Tail assembly 1315, which terminates in a weighted bulb 1320, may house one or more batteries that are used to provide power to the one or more motors in central housing 1335, and may also house additional items such as a radio-frequency (RF) transceiver and a controller unit incorporating a microprocessor or microcontroller. In one embodiment, tail assembly 1315 is composed of alternating sections of rigid and elastic materials (indicated by the alternating dark and light bands) that are loosely modeled to vertebrae in a spine. Such an arrangement allows terrain traversing device 1300 to bend and twist, thus providing certain advantages during motion, as well as during impact when falling from a height. Various other elements such as cushions, pads, springs, extension arms, and cladding may be incorporated into various parts (e.g., axle, tails section, etc.) of the terrain traversing device 1200 in order to protect the device during impact from falls at various heights.

In the embodiment, axle 1330 has a modular design and is fabricated using a suitable material having desirable properties such as light weight, durability, and impact absorption. In one implementation, axle 1330 is formed of selective laser sintered (SLS) high-elongation polyamide-based materials.

Each of wheel assemblies 1305 and 1325 is composed of an array of microspine wheel assemblies. More particularly, wheel assembly 1325 includes a first microspine wheel assembly 200a (such as the one shown in FIG. 2) that is mounted adjacent to a second microspine wheel assembly 200b (which is similar to the first microspine wheel assembly 200a) with a divider disk 1326 interposed therebetween. The major surfaces of rotors of each of the first and second microspine wheel assemblies 200a and 200b, with divider disk 1326 interposed therebetween, are arranged substantially parallel to each other.

The divider disk 1326 that is interposed between adjacent pairs of microspine wheel assemblies is operative to provide a separation distance between the microspine hooks of the adjacent microspine wheel assemblies thereby limiting the motion of each microspine hook to a rotary plane and preventing entanglement between the microspine hooks. The divider disk 1326 also provides a more even contact surface for the wheel assembly with a horizontal surface when terrain traversing device 1300 is traversing the horizontal surface. This is achieved in part by suitably dimensioning divider disk 1326 with respect to the microspine wheel assemblies, so as to provide a recessed circumferential slot between two adjacent microspine wheel assemblies. The slot may also accommodate a horizontal flexing action of the microspine hooks without entanglement with other microspine hooks, when terrain traversing device 1300 is traversing the horizontal surface. In one embodiment, divider disk 1326 is selected to have a thickness of about 0.15 mm.

The divider disk 1326 may be alternatively referred to herein as a spacer disk. In one embodiment, the spacer disk is implemented as a separate component independent of the microspine wheel assemblies. In another embodiment, the separation between adjacent microspine wheel assemblies may be provided by providing suitable protrusions on the body of one or both of the microspine wheel assemblies.

Figure 14:
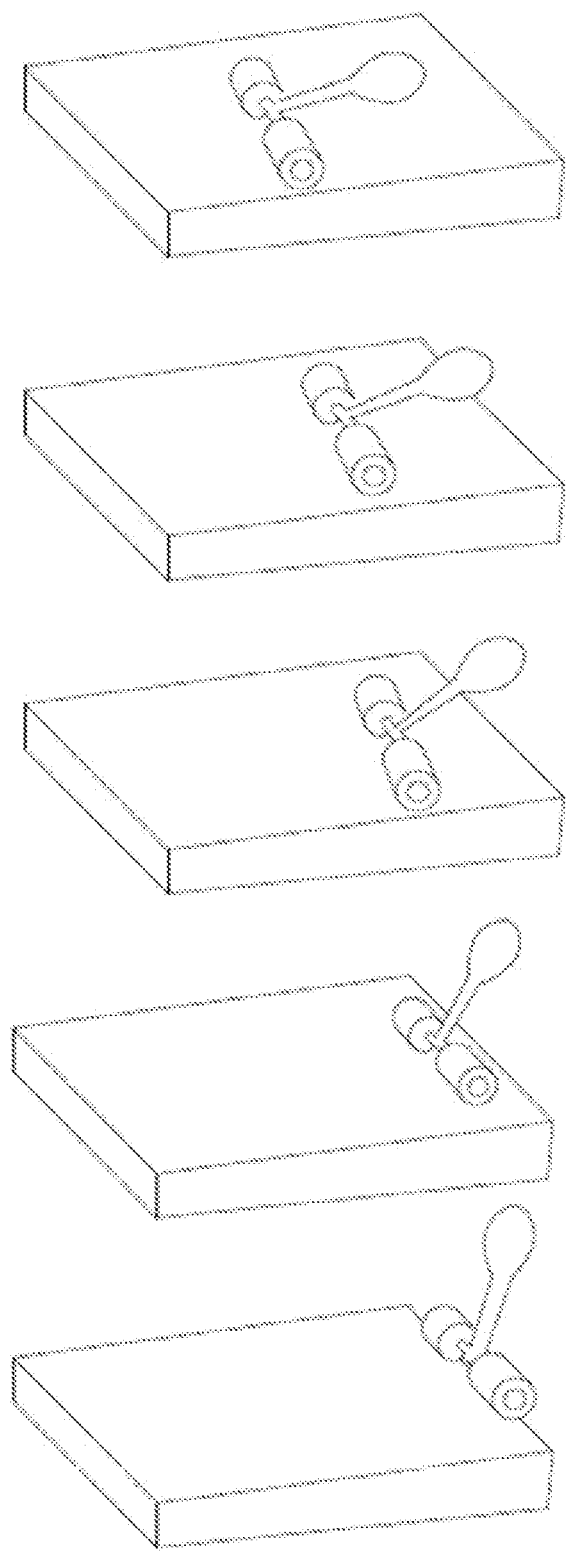
FIG. 14 shows a series of figures to illustrate a terrain traversing device traversing from a horizontal surface to a vertical surface in accordance with an example embodiment of the present disclosure.

With reference now to FIG. 14, the illustration shows a sequential series of figures to illustrate a terrain traversing device transitioning from traversing a horizontal surface to traversing a vertical surface in accordance with the present disclosure. Using a rotary implementation (wheel with microspines) instead of a linear implementation (as in the prior art) provides for a symmetrical transition from one traversal plane to another traversal plane, more so when the two planes are angularly oriented with respect to each other. More particularly, the use of wheels equipped with micro spines allows the terrain traversing device to transition smoothly and quickly from a horizontal surface to a vertical surface (and vice-versa). In contrast, a linear implementation would entail complex maneuvers that are not only disjointed, but also relatively ineffective, especially when attempting to transition from one traversal plane to an orthogonal traversal plane.

Furthermore, in contrast to prior art wheeled devices, the traversal from the horizontal surface to the vertical surface is not constrained by the diameter of the wheel assemblies In other words, diameter $d_1$ 245 (as seen in FIG. 2) may be determined independent of a height dimension of an irregularity in the traversal surface. For example, it is not necessary that the diameter of the wheel assembly be at least, say, 75% of the height of an obstacle to be surmounted. Consequently, in one embodiment, diameter $d_1$ 245 of the circular planar rotor is less than 75% of an object dimension such as for example, a curb height or a step height. However, in another embodiment, diameter $d_1$ 245 of the circular planar rotor is larger than an object dimension such as, for example, a protrusion or a crevasse in a wall.

More particularly, in one example application, a terrain traversing device in accordance with the disclosure includes two 10 mm brushed DC motors that provide approximately 0.2 Nm of torque, which is adequate for the terrain traversing device to climb up a vertical surface while having an intrinsic weight of 300 grams and a payload of up to 100 grams. A microcontroller is used to control the rotation of the wheel assemblies based on remote commands, or on input from one or more sensors (not shown). A hybrid open-loop control architecture permits various throttle settings to provide for various torques such a first torque that is desirable for high speed traversal of a horizontal surface and a different torque that is desirable for better control when the terrain traversing device climbs up a vertical surface. A 7.4 V, 180 mAh LiPo battery pack provides approximately 20 minutes of mission life to the terrain traversing device. As can be understood, a higher capacity battery pack may be used instead, thereby incorporating higher weight and reduced speed, in order to obtain a longer mission life.

Furthermore, in this example application, the terrain traversing device can traverse a horizontal surface at a ground speed of about 45 cm/second and climb up a concrete surface having an incline of up to 90 degrees at a climbing speed of about 25 cm/second.

Figure 15:
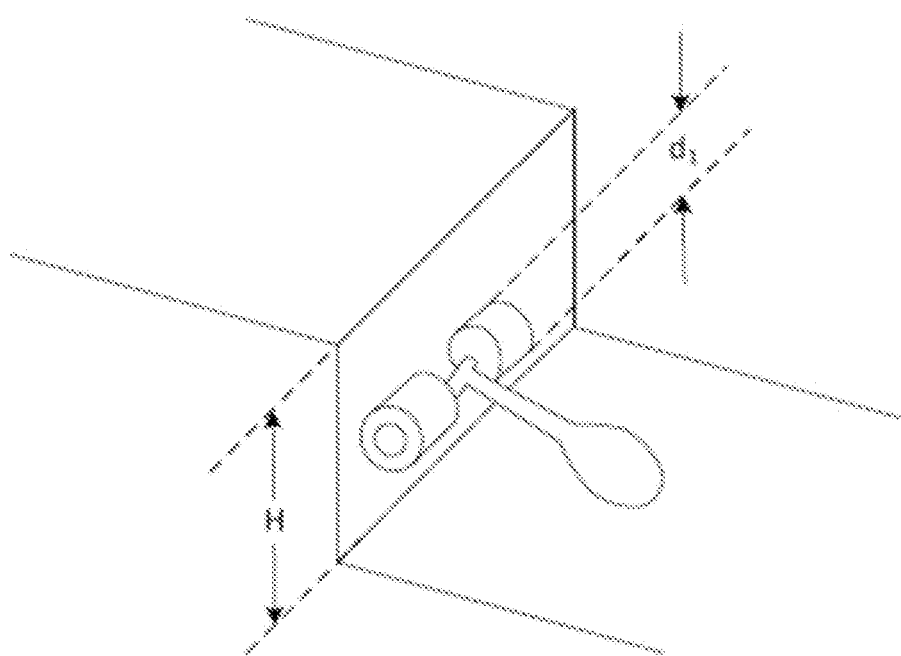
FIG. 15 indicates dimensional values associated with a terrain traversing device shown traversing a step in accordance with an example embodiment of the present disclosure.

FIG. 15 indicates dimensional values associated with an embodiment of a terrain traversing device shown traversing a step in accordance with the present disclosure. Specifically, as shown, diameter $d_1$ of the microspine wheel assembly is less than the height "H" of the step. In one implementation, diameter $d_1$ of the microspine wheel assembly is about 240 mm.

As indicated in the description above, in contrast to prior art devices, traversal from the horizontal surface to the vertical surface is not constrained by the diameter of the wheel assembly. In other words, diameter $d_1$ may be determined independent of height "H" and it is not necessary that diameter $d_1$ be at least, say, 75% of height "H" as is the requirement in some prior art implementations. It will be understood however, that in various other implementations, diameter $d_1$ may turn out to be greater than the height of certain other objects in the traversal path. In contrast to prior art practice, such variances in the terrain surface do not have to be necessarily taken into consideration when selecting diameter $d_1$ 245.

Figure 16:
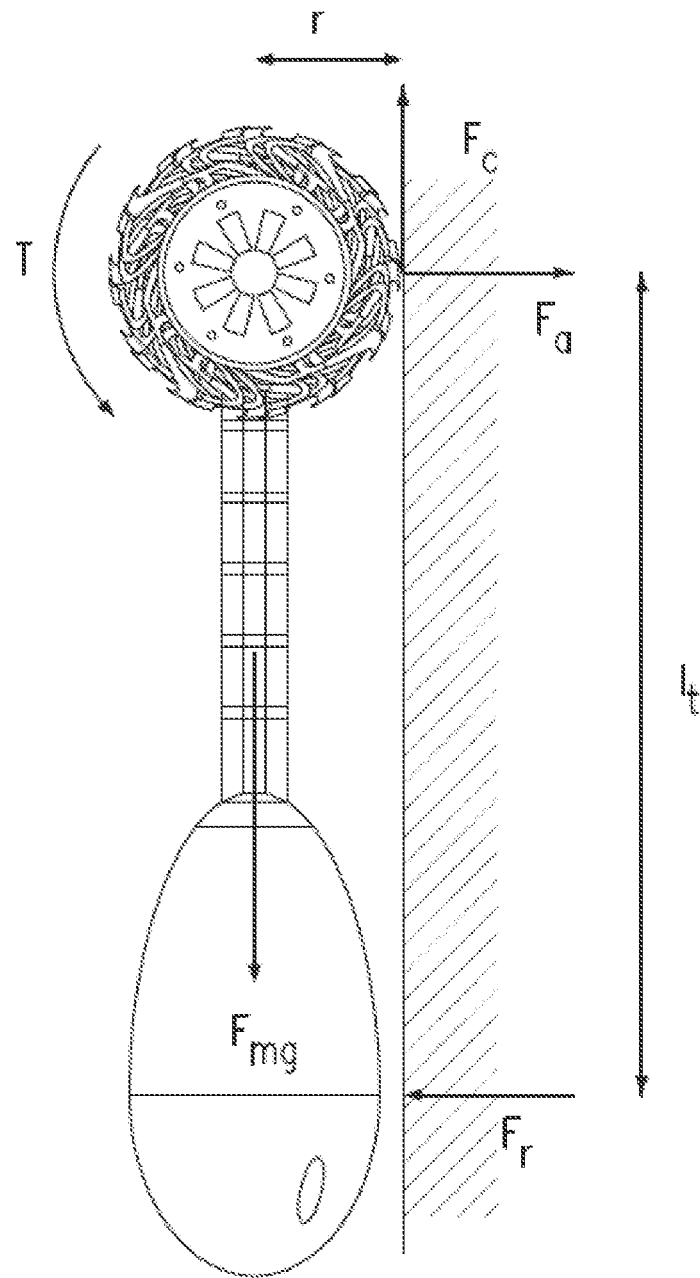
FIG. 16 shows a line drawing indicating various parameters associated with a terrain traversing device when traversing a vertical surface in accordance with an example embodiment of the present disclosure.

Attention is now drawn to FIG. 16, which shows a line drawing indicating various parameters associated with a terrain traversing device (using the DROP embodiment as an example) when traversing a vertical surface in accordance with the present disclosure. The two-wheeled architecture described above is selected in part to provide a balance between adhesive forces created by the microspine hooks and the reactive force created by the weighted bulb at the end of the tail assembly. For the quasi-static condition indicated in FIG. 16, it is desirable that the adhesive force ($F_a$) be greater than the normal reaction at the tail ($F_r$) and pitch-back moment. This can be expressed as follows:

$$F_{a\_maximum} \geq \frac{(Fmg*r) + T}{l_t}$$

Assuming that the radius (r) of the microspine wheel assembly is constant, the body length ($l_t$) may be selected so as to obtain a balance between horizontal and vertical traversal performance of the terrain traversal device. The selection of the body length is dependent on a number of factors including the mass of the terrain traversing device, surface conditions, and quality of engagement of the microspine hooks. It may be pertinent to point out that good purchase may be obtained on certain types of surfaces that are not intrinsically smooth in nature. A few examples of such surfaces include wood, stone, stucco, brick, and concrete surfaces that have irregularities in which the microspine hooks can obtain engagement.

Further details concerning a variety of different embodiments for the microspine wheel assembly will be provided below. Such embodiments correspond not only to the two-wheeled device already described above but also other embodiments which are one, three and four-wheeled.

Single Wheel Test Platform

Figure 17:
FIG. 17 shows an embodiment of a terrain traversing device according to the present disclosure as being a single wheel test platform.

In an embodiment of the present disclosure, a single wheel test platform, as illustrated in FIG. 17 is provided. This was created to decrease the time and work necessary to build new wheel designs. The single wheel test platform is a simple, small robot consisting of a housing for a motor that also works as an axle for a single rotary microspine wheel assembly. The speed control is managed by a micro-controller. Furthermore, the embodiment is powered by a 7.4 V 180 mah two cell lithium polymer battery. With its reduced size and weight (around 60 grams), the single wheel test platform could use a smaller number of microspines for conducting tests.

With respect to the single wheel test platform, a tail is made of aluminum armature wire. The wire is rigid enough to react to the torque of the motor but can still be easily bent and manipulated to change the shape as desired. In particular, the tail can be adapted to react to the torque being applied by the motors at different points on a wall. The tail attachments on either side of the axle can be removed to change the wheel assemblies or to link multiple test platforms together to test the effectiveness of different configurations.

DROP (Durable Reconnaissance and Observation Platform) Family

As shown above, for example, in FIG. 1, embodiments of two-wheeled terrain traversing devices can be seen. In particular, DROP is one embodiment of such two-wheeled configurations. Specifically, the body of the DROP device is made from a selective laser sintered (SLS) high-elongation polyamide-based material. Such material features high impact strength.

With respect to the embodiments of the DROP family, a tail is constructed from alternating sections of rigid and flexible material (similar to the vertebrae of a spine). This alternating configuration contributes to impact resiliency by distributing the forces of impact across multiple elements.

Embodiments of DROP use a microprocessor that allows teleoperation using a 2.4 GHz remote control unit. In other embodiments, a video/audio payload can be integrated onto DROP.

In an embodiment of the DROP family, a smaller version (having a mass of 280 grams of which 112 grams correspond to the wheels), is also possible. This embodiment also incorporates encoders and closed loop velocity control for the wheels.

In a further embodiment, a slimmer test platform has been developed allowing the center of gravity to be closer to the wall. This reduces the contribution of the off the wall forces due to the distance of the center of gravity off the wall. However, such embodiment has a tradeoff that results in a reduced combined flexure length. Even so, with the self-righting and gripping from the sweep angle, this may still have a good wall climbing potential.

Powered Tail Family

Figure 18:
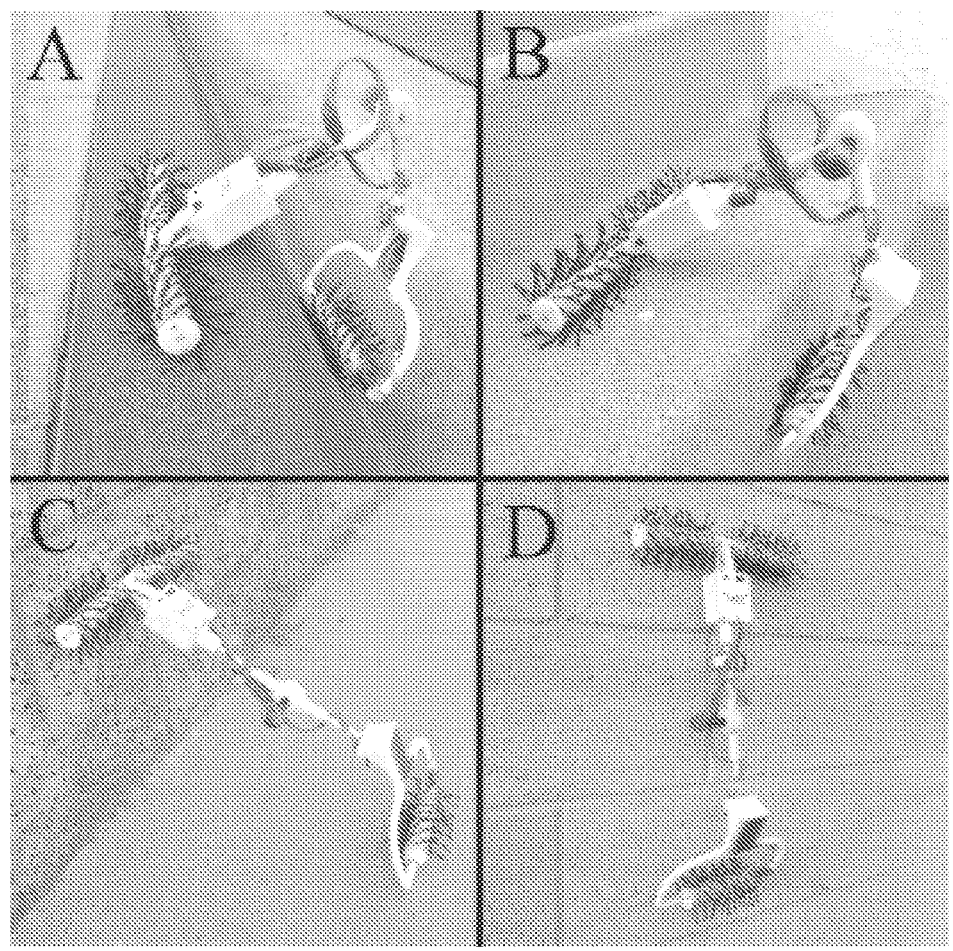
FIGS. 18A-18D show an embodiment of a "powered tail" platform according to the present disclosure.

As seen, for example, in FIG. 18, embodiments for a powered tail terrain traversing device are provided. In particular, such devices are embodiments which illustrate that three and four-wheeled devices are possible where the third and/or fourth wheels would be designed with the "powered tail". As seen in the four panels of FIG. 18, embodiments are able to transition based on the surface the terrain traversing device is encountering (e.g., ground, curbs, stairs, and walls).

An embodiment of the powered tail terrain traversing device was built using a pair of single wheel test bots connected with aluminum armature wire in a linear motorcycle-like configuration. This terrain traversing device showed impressive curb-mounting and stair climbing performance. However, because this embodiment did not use a radio and only had a dial to adjust speed, the terrain traversing device was unable to turn, slow down or speed up.

In a different embodiment, a leader-follower design was created which used two, independently controlled front wheels and a single wheel at the end of the tail. This configuration realizes the benefits of leader-follow architecture but also allows turning and speed control. In one embodiment, the rear wheel was commanded to rotate at a rate that is the average of the front two wheels. This produces a smooth motion and limits scrubbing during turning. Furthermore, embodiments are possible where the tail may have two wheels in an arrangement similar to the front wheels (e.g., the first and second microspine wheel arrangement).

As seen in FIG. 18, the tail has an elbow at the center that can be controlled between 70 and 180° (flat), which allows the robot to have at least one wheel always in contact with a flat surface during stair climbing. This creates a push-pull dynamic that helps minimize falls. Such embodiments can even climb stairs with a 15° overhanging face angle.

To enable embodiment of the powered tail family to conform to varying aspect ratios on stairs and also to climb walls, a morphing robot configuration was designed using a locking hinge as the elbow in the middle of the tail. A clutch mechanism actuated by a linear screw was used to lock and unlock the tail after the front and back wheels were driven to position the tail at the appropriate range. A wider back wheel was necessary with this design to balance asymmetrically weight created by the cantilevered motor. This allowed such embodiments to have diverse capabilities.

Front and rear inertial measurement units consisting of accelerometers and gyroscopes have been incorporated into other embodiments of the powered tail platforms to implement a control system that recognizes the climbing modes (e.g., driving, climbing curbs/stairs, or climbing walls). Such controller would automatically adjust the speed of the actuators for a given terrain, including speeding and slowing the back wheel during stair climbing to minimize the chance of a topple-over fall. Currently, such implementation is being performed using skilled teleoperation.

Insect-Sized Climbers

Embodiments, as shown above, have been successfully implemented on a variety of platforms from 600 g with a flexure length of 60 mm down to a 12 g platform with flexure lengths of 12 mm. This scalability allows implementation for a large variety of platforms and applications. Lighter platforms are inherently more crash proof. However, shorter flexure lengths create challenges in the design of the microspines.

Additionally, tests concerning the crash-proof nature of the embodiments have been tested by launching the platforms 20 meters in a break-away shell. There are embodiments which have demonstrated full functionality after impact.

Figure 19A:
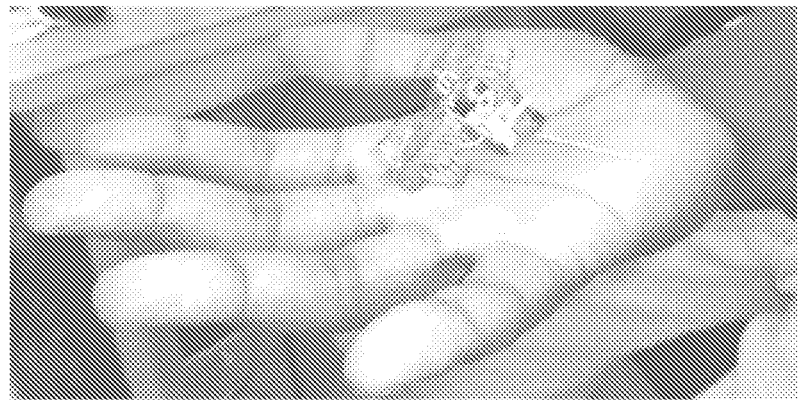
FIGS. 19A-19C show embodiments according to the present disclosure of insect sized platforms.
Figure 19B:
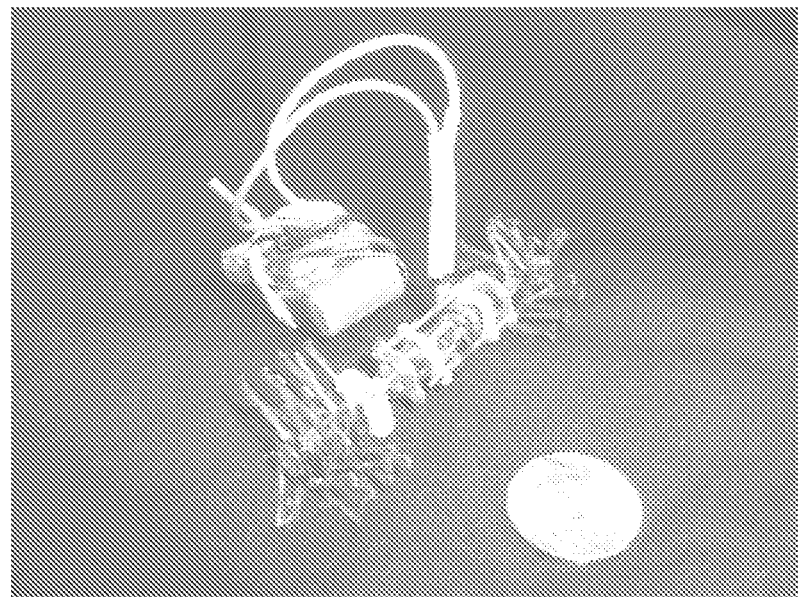
Figure 19C:
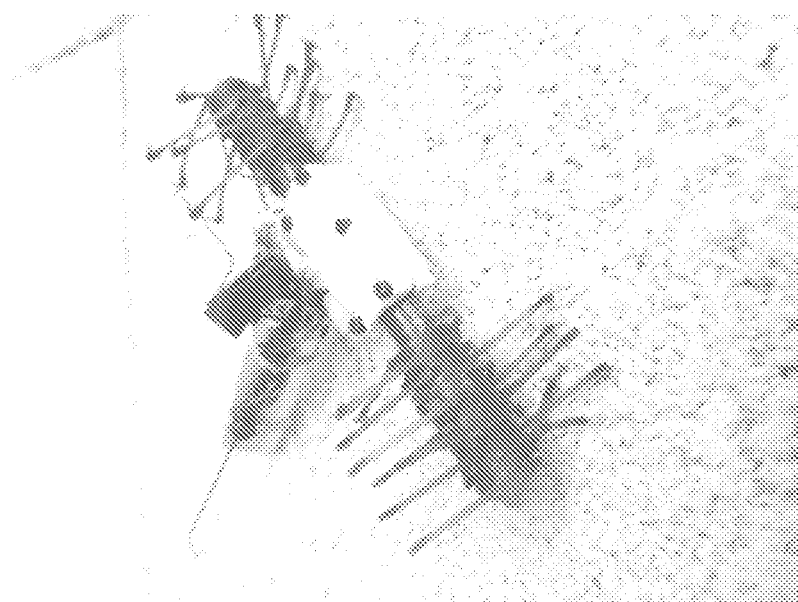

As seen in FIGS. 19A-19C, insect-sized platforms have been designed and fabricated. In an embodiment of such insect-sized platform (FIG. 19A), such platform was created from re-purposed toy motors and was proof that demonstrated an ability of shape deposition manufacturing to create microspine wheels at this small scale. This embodiment was controlled by an infrared remote control.

In another embodiment (FIG. 19B), pager motors with after market gear boxes were used. This platform had the ability to transition from horizontal to vertical surfaces and to climb short distances. Even when loaded with a 23 gram electronics package from DROP, the robot traveled 3 meters a second on flat ground. Furthermore, such robot was extremely robust to falls.

In a further embodiment (FIG. 19C), two motors with 57:1 gear boxes were used. The robot was teleoperated using a receiver with built in reversible electronic speed controls. To be able to climb over grout lines, microspines with only two flexures were used to increase the length of each flexure. The −5° sweep angle was also incorporated. While slower than the pager motor based robot, this platform was able to reliably climb a cinder block wall test and climb several feet on a variety of buildings. The platform can also climb horizontally across walls and turn while on the wall with a payload capacity of 20 g.

In conclusion, using a rotary motion (rather than a linear dragging motion) for enabling engagement of microspine hooks on a surface (as described herein using a terrain traversal device) not only permits automatic transitioning from traversal of a horizontal surface to traversal of a near-vertical surface without manual intervention, but also permits terrain traversal at speeds higher than those obtainable via legged devices for example and with less number of motors and less overall complexity. The use of suitably light weight and durable materials for fabricating the terrain traversal device provides durability during impact as a result of a fall from a height, thereby eliminating the need for safety mechanisms or retrieval mechanisms. Furthermore, the terrain traversal device in accordance with the disclosure provides several advantages over prior art devices that are handicapped when traversing certain types of surfaces, such as rough or dusty surfaces (e.g., concrete, stone, etc.).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the terrain traversal device of the disclosure, and are not intended to limit the scope of what the inventors regard as their disclosure. Modifications of the above-described modes for carrying out the disclosure may be used by persons of skill in the robotic arts, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A terrain traversing device, comprising:
a housing;
at least one microspine wheel assembly comprising a circular planar rotor with one or more microspine hooks arranged on a circumferential edge of said circular planar rotor, each microspine hook mounted on a respective independently flexible suspension that accommodates variable engagement angles between said microspine hook and irregularities on a terrain surface as the at least one microspine wheel assembly rotates in one direction to urge the terrain traversing device to traverse the terrain surface;
at least two axles, comprising a first and second axle, wherein the at least one microspine wheel assembly is at least two microspine wheel assemblies, each mounted on a respective axle whereby the circular planar rotor of each microspine wheel assembly is rotatable in one direction, with the respective axle, to urge the terrain traversing device to traverse the terrain surface or more motors housed in the housing and coupled to the at least two axles, the two or more motors configured to respectively rotate the at least two microspine wheel assemblies in one direction to urge the terrain traversing device to traverse the terrain surface, wherein
the at least two axles are mounted substantially adjacent to each other with the wheel assemblies substantially parallel to each other and have a sweep angle with respect to each other and to a center of the terrain traversing device, and
a positive sweep angle corresponds to the microspine wheel assemblies of the first and second axles forming a chevron shaped arrangement with respect to the center of the terrain traversing device.

2. The terrain traversing device of claim 1, wherein a 0° sweep angle corresponds to the microspine wheel assemblies of the first and second axles being parallel and orthogonal with respect to the center of the terrain traversing device.

3. The terrain traversing device of claim 1, wherein the variable engagement angles are between 60-80°.

4. The terrain traversing device of claim 1, wherein the two or more motors each have a respective axle of said at least two axles and are configured to independently operate the axles independently thereby adapting the device to turn or provide speed control for the device based on the different instructions given to each of the axles.

5. The terrain traversing device according to claim 1, wherein the independently flexible suspension comprises a geometrical notch.

6. The terrain traversing device according to claim 1, wherein the device has a mass between 7 grams to 600 grams.

7. A terrain traversing device, comprising:
a housing;
at least one microspine wheel assembly comprising a circular planar rotor with one or more microspine hooks arranged on a circumferential edge of said circular planar rotor, each microspine hook mounted on a respective independently flexible suspension that accommodates variable engagement angles between said microspine hook and irregularities on a terrain surface as the at least one microspine wheel assembly rotates in one direction to urge the terrain traversing device to traverse the terrain surface;
at least one axle, wherein the at least one microspine wheel assembly are each mounted on a respective axle whereby the circular planar rotor of each microspine wheel assembly is rotatable in one direction, with the respective axle, to urge the terrain traversing device to traverse the terrain surface; and
at least one motor housed in the housing and coupled to the at least one axle, the at least one motor configured to rotate the at least one microspine wheel assembly in one direction to urge the terrain traversing device to traverse the terrain surface, wherein the at least one microspine wheel assembly further comprises adhesive materials, the adhesive materials arranged adjacent to or interstitially with the microspines to provide alterative and additional adhesive forces for engaging the terrain wall.

8. The terrain traversing device of claim 7, wherein the adhesive materials are electrostatic or electroadhesive materials, fibrillar adhesive pads, pressure sensitive adhesive pads or tape, and electro- or permanent magnets.

9. A terrain traversing device, comprising:
a housing;
at least one microspine wheel assembly comprising a circular planar rotor with one or more microspine hooks arranged on a circumferential edge of said circular planar rotor, each microspine hook mounted on a respective independently flexible suspension that accommodates variable engagement angles between said microspine hook and irregularities on a terrain surface as the at least one microspine wheel assembly rotates in one direction to urge the terrain traversing device to traverse the terrain surface;
at least one axle, wherein the at least one microspine wheel assembly are each mounted on a respective axle whereby the circular planar rotor of each microspine wheel assembly is rotatable in one direction, with the respective axle, to urge the terrain traversing device to traverse the terrain surface;
at least one motor housed in the housing and coupled to the at least one axle, the at least motor configured to rotate the at least one microspine wheel assembly in one direction to urge terrain traversing device to traverse the terrain surface;
a tail, the tail configured to adapt between a first position and a second position and vice versa thereby adapting the device in traversing different surfaces, wherein:
the first position corresponding to the tail has a substantially 90° elbow at the center,
the second position corresponding to the tail being substantially 180°, and the tail comprises one or more microspine wheel assembly mounted on one or more tail axles associated with the tail.

10. The terrain traversing device of claim 9, wherein the different surfaces being traversed comprises a horizontal ground, stairs, curbs and a vertical wall.

11. The terrain traversing device of claim 9, wherein the one or more tail axles associated with the tail having corresponding motors and are configured to operate independently from the one or more axles of the terrain traversing device not associated with the tail.

* * * * *